(12) United States Patent
Norasak et al.

(10) Patent No.: US 9,659,241 B1
(45) Date of Patent: May 23, 2017

(54) METHOD FOR PRINTING ON A STATIONARY FLAT MEDIA USING A PORTABLE LARGE FORMAT PRINTER

(71) Applicant: FUNAI ELECTRIC CO., LTD., Osaka (JP)

(72) Inventors: Sam Norasak, Lexington, KY (US); Michael A. Marra, III, Lexington, KY (US); Bruce A. Deboard, Georgetown, KY (US)

(73) Assignee: FUNAI ELECTRIC CO., LTD. (JP)

(*) Notice: Subject to any disclaimer, the term of this patent is extended or adjusted under 35 U.S.C. 154(b) by 0 days.

(21) Appl. No.: 14/943,713

(22) Filed: Nov. 17, 2015

(51) Int. Cl.
| | |
|---|---|
| *B41J 25/308* | (2006.01) |
| *G06K 15/02* | (2006.01) |
| *G06K 15/10* | (2006.01) |
| *B41J 2/01* | (2006.01) |

(52) U.S. Cl.
CPC .............. *G06K 15/021* (2013.01); *B41J 2/01* (2013.01); *G06K 15/102* (2013.01)

(58) Field of Classification Search
CPC ............................ B41J 25/308; G06K 15/021
See application file for complete search history.

(56) References Cited

U.S. PATENT DOCUMENTS

| | | | |
|---|---|---|---|
| 6,709,085 B2 | 3/2004 | Hoshino et al. | |
| 6,729,706 B1 * | 5/2004 | Patton | B41J 2/01 347/2 |
| 7,806,493 B2 * | 10/2010 | Gazeau | B41J 3/4073 347/2 |
| 8,139,872 B2 | 3/2012 | Howell et al. | |
| 8,587,743 B2 | 11/2013 | Takafuji | |
| 2007/0263244 A1 | 11/2007 | Sugitani et al. | |

* cited by examiner

*Primary Examiner* — Jason Uhlenhake
(74) *Attorney, Agent, or Firm* — Aust IP Law

(57) ABSTRACT

A method for operating a portable large format inkjet printer includes determining an output image size of an output image to be printed on a stationary flat media; selecting a source image to serve as the output image; displaying a preview of the output image superposed with an output image grid defining a plurality of output image area portions; selecting a serial order of printing each of the output image area portions; selecting a next output image area portion based on the serial order; printing the selected next output image area portion at a media print area of the stationary flat media; and repeating the acts of selecting the next output image area portion and printing, for each of the plurality of output image area portions, until an entirety of the output image area has been printed at the media print area of the stationary flat media.

16 Claims, 15 Drawing Sheets

METHOD FOR PRINTING ON A STATIONARY FLAT MEDIA USING A PORTABLE LARGE FORMAT PRINTER

CROSS-REFERENCE TO RELATED APPLICATIONS

None.

BACKGROUND OF THE INVENTION

1. Field of the Invention

The present invention relates to large format printers, and, more particularly, to a method for printing a large media print area on a stationary flat media using a portable large format inkjet printer.

2. Description of the Related Art

Present large format printers are very large, heavy, and cumbersome, and are not intended to be portable. Typically, such prior large format printers are not readily movable after initial installation at a printing site, and thus are not considered to be portable. Also, such prior large format printers are relatively expensive to purchase. Additionally, such prior large format printers do not provide a good solution for printing on a large stationary surface, such as for example, a floor or wall.

What is needed in the art is a portable large format printer and method for printing a large media print area on a stationary flat media.

SUMMARY OF THE INVENTION

The present invention provides a portable large format printer and method for printing directly on a large media print area on a stationary media, such as printing directly on a stationary flat surface. The stationary flat surface may be formed of any flat printable media, such as a surface made of one or more of cement, brick, wood, laminated surfaces, stone, marble, glass, carpet, fabric, etc. Such surfaces may be, for example, in the form of a floor, a wall, plate glass, a ceiling, a countertop, a patio, a driveway, a walkway, a sidewalk, etc. The method of the present invention facilitates the printing of an image on a media print area that is larger than the resident print area of the portable large format printer by dividing the associated image data and media print area of the stationary flat media into a plurality of sectional print zone grids. The portable large format printer is then positioned, and aligned, at each sectional print zone grid to individually print each sectional print zone grid that forms the media print area.

As used herein, the term "printable media" means a substrate having a surface capable of accepting, absorbing, and/or adhering to ink jetted onto the surface and allowed to dry. The term "flat surface" refers to a generally planar surface, which may be entirely smooth, entirely non-smooth, or a combination of smooth and non-smooth surface portions. A non-smooth surface is a surface that includes surface irregularities, such as dips, rises, indentations, pores, cracks, surface offsets, etc. The term "generally planar surface" is a surface wherein a curvature deviation from planar is within a range of ±2 inches (approximately ±6 centimeters) over a span of 4 feet (1.22 meters), and wherein the surface may have surface deviations from planar in a range of ±2 inches (approximately ±6 centimeters).

The invention in one form is directed to a method for operating a portable large format inkjet printer for printing an image at a media print area of a stationary flat media, including determining an output image size of an output image to be printed at the media print area of the stationary flat media; selecting a source image to serve as the output image; displaying a preview of the output image superposed with an output image grid to represent a division of the output image and corresponding output image data for printing, the output image grid defining a matrix having a plurality of output image area portions; selecting a desired grid printing pattern mode from a plurality of selectable grid printing pattern modes, wherein each of the plurality of selectable grid printing pattern modes defines a unique serial order of printing each of the plurality of output image area portions being displayed; selecting a next output image area portion of the plurality of output image area portions for printing based on the unique serial order defined by the desired grid printing pattern mode; printing the selected next output image area portion at the media print area of the stationary flat media; and repeating the acts of selecting the next output image area portion and printing for each of the plurality of output image area portions until an entirety of the output image area has been printed at the media print area of the stationary flat media.

The invention in another form is directed to a method for printing an image at a media print area of a stationary flat media, including providing a portable large format inkjet printer having a controller, a user interface, and a printhead carrier system configured to carry a plurality of inkjet printheads; providing a memory circuit having stored therein image data for at least one image; operating the user interface to input to the controller an output image size of an output image to be printed at the media print area of a stationary flat media; operating the user interface to select from the memory circuit a source image to serve as the output image for printing at the media print area of the stationary flat media; converting source image data representing the source image to output image data representing the output image at the output image size; dividing an output image area defined by the output image size into an output image grid to form a matrix having a plurality of output image area portions; displaying at the user interface a preview of the output image superposed with the output image grid to represent a division of the output image and output image data for printing, the output image grid defining a matrix having a plurality of output image area portions; dividing the output image data into a plurality of output image data portions, wherein each output image data portion corresponds to a respective output image area portion of the plurality of output image area portions; selecting an output image area portion of the plurality of output image area portions for printing, the selected output image area portion being represented by a corresponding output image data portion; inputting a print command at the user interface to process the corresponding output image data portion and to initialize printing of the selected output image area portion at the media print area of the stationary flat media.

The invention in another form is directed to a method for printing a source image at a media print area of a stationary flat media, including providing a portable large format inkjet printer having a resident print area; determining a source image size of the source image, the source image being represented by source image data having a source image aspect ratio; defining an output image size of an output image, the output image corresponding in visual content to the source image, and the output image size defining an output image area larger than the resident print area of the portable large format inkjet printer; converting the source image data of the source image into output image data that corresponds to the output image at the output image size; dividing the output image area defined by the output image size into an output image grid having a plurality of output image area portions; dividing the output image data into a plurality of output image data portions, wherein each output image data portion corresponds to a respective output image area portion of the plurality of output image area portions; positioning and aligning the portable large format inkjet printer at the media print area of the stationary flat media prior to printing a first output image area portion of the plurality of output image data portions; printing the first output image area portion based on a first output image data portion of the plurality of output image data portions; and repeating the acts of positioning and aligning, and printing, for each of the plurality of output image area portions and corresponding plurality of output image data portions until an entirety of the output image area has been printed at the media print area of the stationary flat media.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
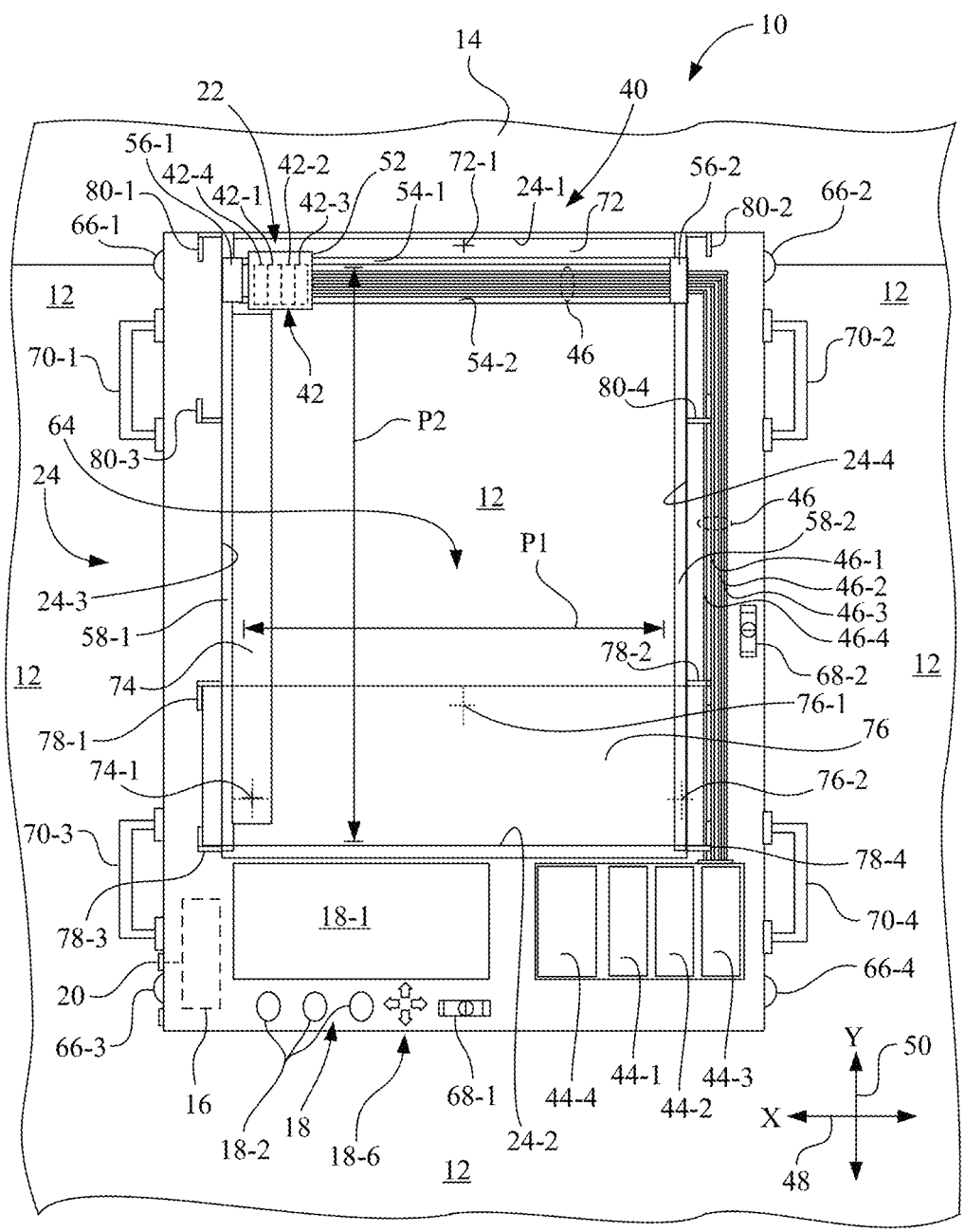
FIG. 1 is a top view of a portable large format inkjet printer in accordance with the present invention.
Figure 2:
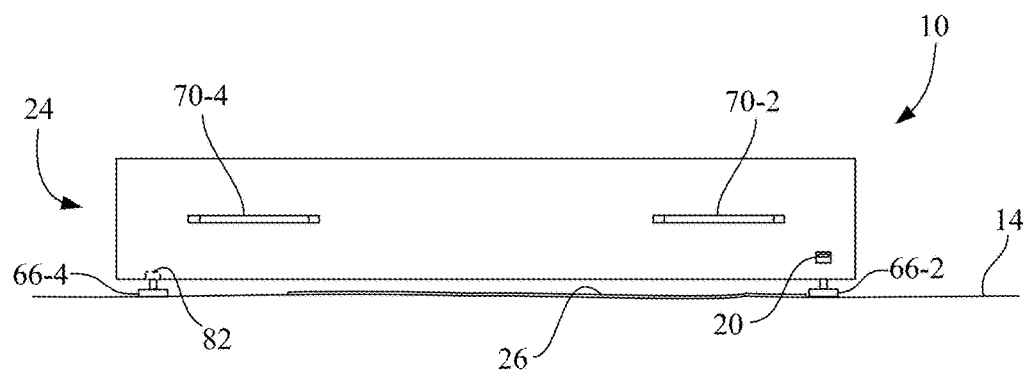
FIG. 2 is a side view of the portable large format inkjet printer of FIG. 1.
Figure 3:
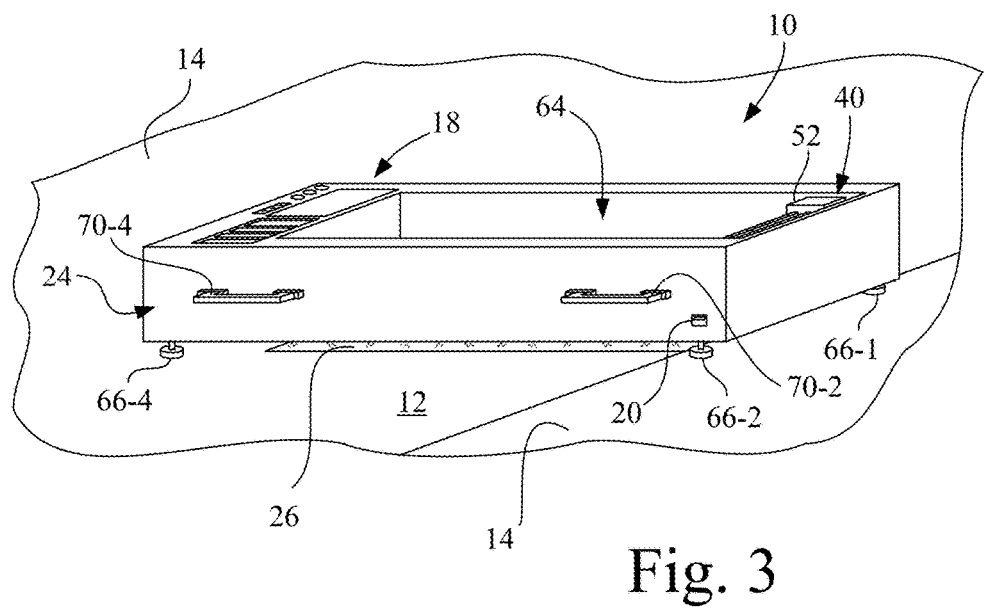
FIG. 3 is a perspective view of the portable large format inkjet printer of FIG. 1.

Referring now to the drawings, and more particularly to FIGS. 1-3, there is shown a portable large format inkjet printer 10 for printing a media print area 12 of a stationary flat media 14. Examples of such stationary flat media include, for example, a floor, a wall, plate glass, a ceiling, a countertop, a patio, a driveway, a walkway, a sidewalk, etc., with a flat surface of which may be formed by a variety of materials, such as, for example, cement, brick, wood, laminated materials, stone, marble, glass, carpet, fabric, etc. In accordance with the present invention, inkjet printer 10 is configured to accommodate any size of media print area 12 of stationary flat media 14, e.g., the size of size of media print area 12 may be tens or hundreds of times larger than that of a resident print area of portable large format inkjet printer 10.

Portable large format inkjet printer 10 includes a controller 16, a user interface 18, an image data input interface 20, and an inkjet print engine 22, and an alignment frame 24.

Figure 4:
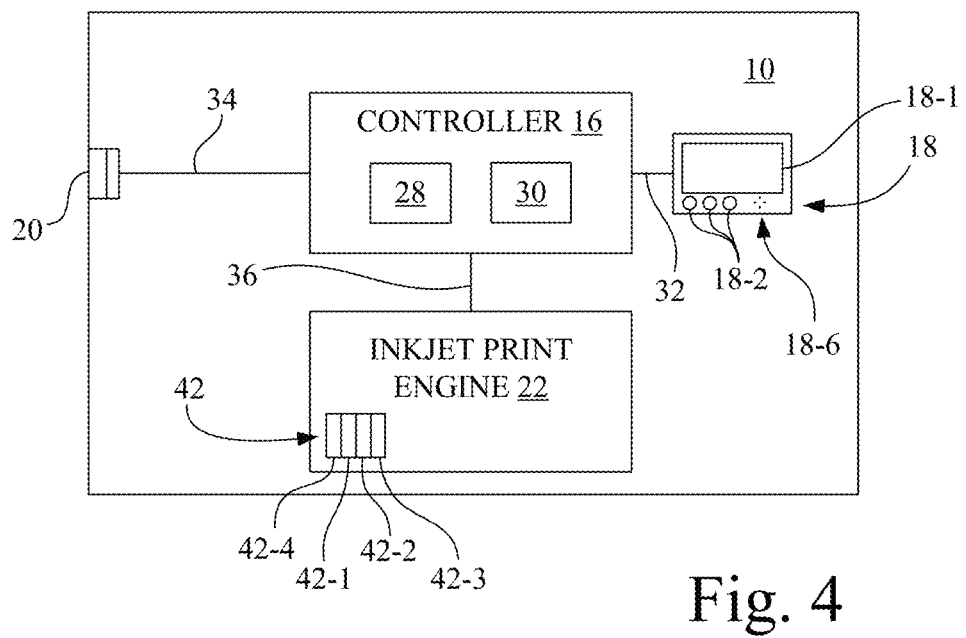
FIG. 4 is a general electrical block diagram of the portable large format inkjet printer of FIG. 1.
Figure 8:
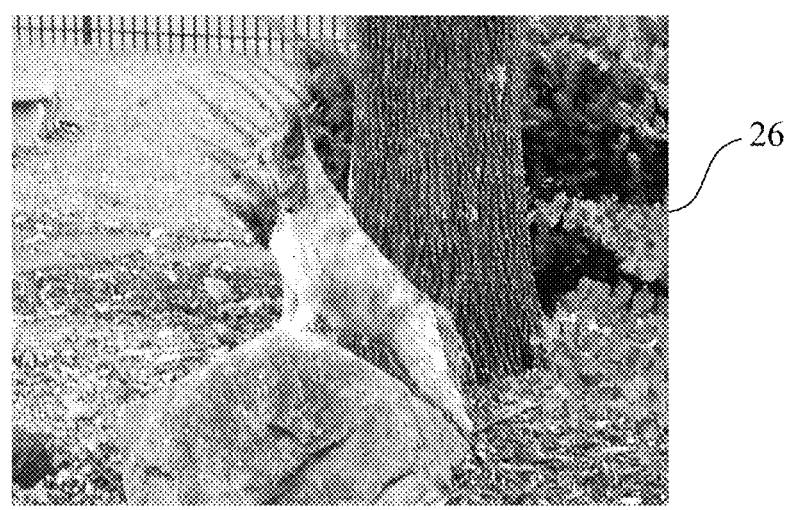
FIG. 8 is an example of an image for printing at a media print area of a stationary flat media.

Referring also to FIG. 4, controller 16 is configured to execute program instructions to facilitate printing of an image, such as an image 26 depicted in FIG. 8, in media print area 12. Controller 16 includes a processor circuit 28 and a memory circuit 30, and may be formed as one or more Application Specific Integrated Circuits (ASIC). Processor circuit 28 of controller 16 is configured via software and/or firmware to operate as a printer controller for performing printing functions, as well as to process user input from, for example, user interface 18 and image data input interface 20.

Processor circuit 28 has one or more programmable microprocessors and associated circuitry, such as an input/output interface, clock, buffers, memory, etc. Memory circuit 30 is communicatively coupled to processor circuit 28, e.g., via a bus circuit, and may include volatile memory circuits, such as random access memory (RAM), and non-volatile memory circuits, such as read only memory (ROM), electronically erasable programmable ROM (EEPROM), NOR flash memory, NAND flash memory, etc.

Controller 16 is electrically connected and communicatively coupled to user interface 18 via a communications link 32, e.g., by wired connections. User interface 18 may be, for example, a touch screen display 18-1 having a touch surface to facilitate user input and a liquid crystal display (LCD) or light emitting diode (LED) display to provide visual information to the user, and may include one or more pushbutton inputs 18-2 (three shown), if desired.

Controller 16 is electrically connected and communicatively coupled to image data input interface 20 via a communications link 34, e.g., by wired connections, bus structure, etc. Image data input interface 20 is configured to receive image data from a user, wherein the image data may be supplied in a wired or wireless fashion. For example, image data input interface 20 may include, for example, a USB port for directly connecting to a computing device, such as a personal computer, or for connecting to a portable memory device, such as a thumb drive having electronic memory. Also, image data input interface 20 may include an Ethernet port for connection to a local area network. Image data input interface 20 may further be configured to directly receive a miniature memory card, such as an SD memory card. Still further, image data input interface 20 may be configured to facilitate wireless communication, e.g., via Bluetooth or IEEE 802.11. Controller 16 executes program instructions to process image data received by image data input interface 20, and to convert (e.g., format, halftone, etc.) the received image data into a data format compatible with inkjet print engine 22 for printing the image represented by the image data at media print area 12 of stationary flat media 14.

Controller 16 is electrically connected and communicatively coupled to inkjet print engine 22 via a communications link 36, such as for example, one or more multi-conductor interface cables. Controller 16 executes program instructions to process print commands, to process image data (e.g., by performing data formatting, half-toning, etc.), and to operate inkjet print engine 22 during a printing operation, to form a printed image at media print area 12 of a stationary flat media 14.

Inkjet print engine 22 has a printhead carrier system 40, a plurality of inkjet printheads 42 (individually 42-1, 42-2, 42-3, and 42-4), and a corresponding plurality of ink reservoirs 44 in fluid communication with the plurality of inkjet printheads 42. In the present embodiment, each of the plurality of inkjet printheads 42 include an associated nozzle array and associated firing heaters, and are coupled in fluid communication with the plurality of ink reservoirs 44 via a corresponding plurality of flexible conduits 46, e.g., rubber tubes.

In the present embodiment, the plurality of ink reservoirs 44 are located off-carrier, i.e., not transported by printhead carrier system 40. The plurality of ink reservoirs 44 may include a cyan ink reservoir 44-1, a magenta ink reservoir 44-2, a yellow ink reservoir 44-3 and a black ink reservoir 44-4. Cyan ink reservoir 44-1 is coupled in fluid communication with inkjet printhead 42-1 via a flexible conduit 46-1. Magenta ink reservoir 44-2 is coupled in fluid communication with inkjet printhead 42-2 via a flexible conduit 46-2. Yellow ink reservoir 44-3 is coupled in fluid communication with inkjet printhead 42-3 via a flexible conduit 46-3. Black ink reservoir 44-4 is coupled in fluid communication with inkjet printhead 42-4 via a flexible conduit 46-4. Alternatively, each of the respective ink reservoir/inkjet printhead combinations may be formed as a unitary inkjet printhead cartridge.

Figure 5:
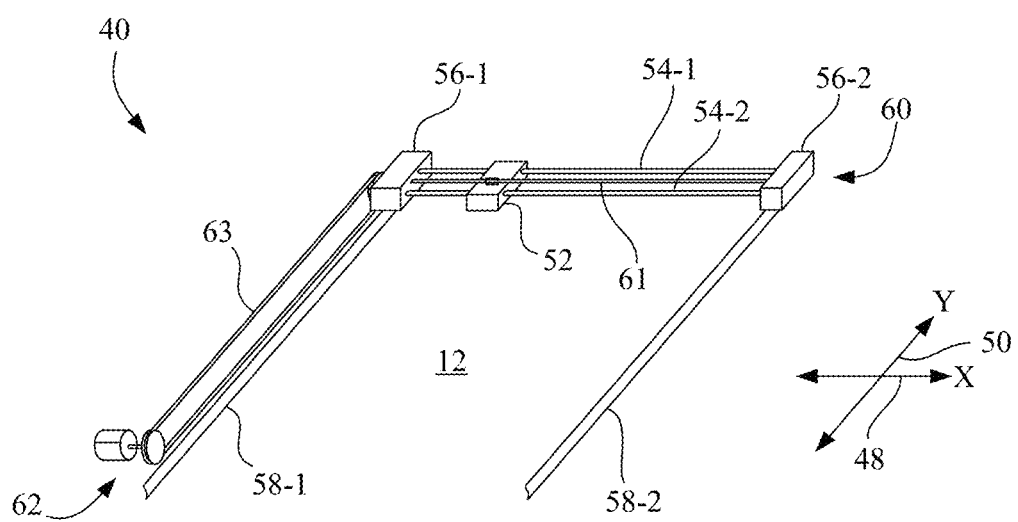
FIG. 5 is a diagrammatic representation of the printhead carrier system of the inkjet print engine of the portable large format inkjet printer of FIGS. 1 and 4.

Referring also to FIG. 5, printhead carrier system 40 is configured to carry, i.e., scan, the plurality of inkjet printheads 42 over media print area 12 in each of two orthogonal directions (e.g., bidirectional X-direction 48 and bi-directional Y-direction 50) during the printing of the image, e.g., image 26. Each of the printhead carrier system 40 and the plurality of inkjet printheads 42 is communicatively coupled to the controller 16 via communications link 36. Controller 16 is configured to execute program instructions to control operation of each of the printhead carrier system 40 and each of the plurality of inkjet printheads 42 in printing the image at media print area 12.

Printhead carrier system 40 includes a printhead carrier 52 for mounting and carrying the plurality of inkjet printheads 42. FIG. 1 shows printhead carrier 52 and the plurality of inkjet printheads 42 at their respective default home position. Printhead carrier system 40, including printhead carrier 52 and the plurality of inkjet printheads 42, is configured to define a first printing extent P1 (see also FIG. 1) in the bidirectional X-direction 48 and a second printing extent P2 in bi-directional Y-direction 50, wherein the dimensions of the first printing extent P1 and the second printing extent P2 define a resident print area P1×P2 of portable large format inkjet printer 10.

As shown in FIGS. 1 and 5, printhead carrier 52 is suspended above media print area 12 for movement in X-direction 48 by a pair of lateral guide members 54-1, 54-2 mounted to, and which extend laterally in X-direction 48 between, two spaced slide blocks 56-1, 56-2. The two spaced slide blocks 56-1, 56-2 are respectively slidably supported for movement in Y-direction 50 by a pair of spaced longitudinal guide members 58-1, 58-2. Each of lateral guide members 54-1, 54-2 and each of longitudinal guide members 58-1, 58-2 may be, for example, a guide rod or a guide rail.

Lateral movement of printhead carrier 52 along X-direction 48 may be effected by a lateral scan mechanism 60, such as a motor driven belt/pulley arrangement having a translation drive belt 61 attached to printhead carrier 52, wherein lateral guide members 54-1, 54-2 define a lateral scanning path of the printhead carrier 52 and the plurality of inkjet printheads 42 along X-direction 48. Based on program instructions executed by controller 16, controller 16 operates lateral scan mechanism 60 to dynamically scan the plurality of inkjet printheads 42 along the lateral scanning path during each of a plurality of lateral printing passes of the plurality of inkjet printheads 42 over media print area 12. The term "lateral" with respect to the scanning path and the printing passes may sometimes also be referred to in the art as a "horizontal" scan path and "horizontal" print passes.

Longitudinal movement of printhead carrier 52 along Y-direction 50 may be effected by a longitudinal scan mechanism 62, such as a motor driven belt/pulley arrangement having a translation drive belt 63 attached to lateral scan mechanism 60, wherein longitudinal guide members 58-1, 58-2 define a longitudinal scanning path of the lateral scan mechanism 60 along Y-direction 50, and in turn, the longitudinal scanning path of printhead carrier 52 and the plurality of inkjet printheads 42 along Y-direction 50. Based on program instructions executed by controller 16, controller 16 operates longitudinal scan mechanism 62 to longitudinally position lateral scan mechanism 60, and in turn, to move printhead carrier 52 and the plurality of inkjet printheads 42, along the longitudinal scan path. The longitudinal scan path sometimes is also referred to in the art as a "vertical" scan path.

The longitudinal scan path is defined by a plurality of discrete longitudinally spaced (i.e., in Y-direction 50) lateral scan positions, and longitudinal scan mechanism 62 is configured to sequentially position lateral scan mechanism 60, and in turn, printhead carrier 52 and the plurality of inkjet printheads 42, at a selected one of the plurality of discrete longitudinally spaced lateral scan positions during each lateral printing pass of printhead carrier 52 and the plurality of inkjet printheads 42 over media print area 12 of stationary flat media 14.

Thus, controller 16 executes program instructions to control the operation of lateral scan mechanism 60 and longitudinal scan mechanism 62 to carry and dynamically scan the plurality of inkjet printheads 42 over media print area 12 in each of the two orthogonal directions (e.g., X-direction 48 and Y-direction 50), while also controlling the operation (i.e., ink jetting) of the plurality of inkjet printheads 42, during the printing of the image, e.g., image 26 of FIG. 8.

Referring again to FIG. 1, alignment frame 24 is configured to fixedly mount the inkjet print engine 22 to facilitate a manual positioning of the alignment frame 24 and the inkjet print engine 22 in unison at the media print area 12. In particular, longitudinal guide members 58-1, 58-2 of printhead carrier system 40 of inkjet print engine 22 are fixedly mounted, e.g., by fasteners, such as bolts, screws, welds, adhesive, etc., to alignment frame 24.

Figure 6:
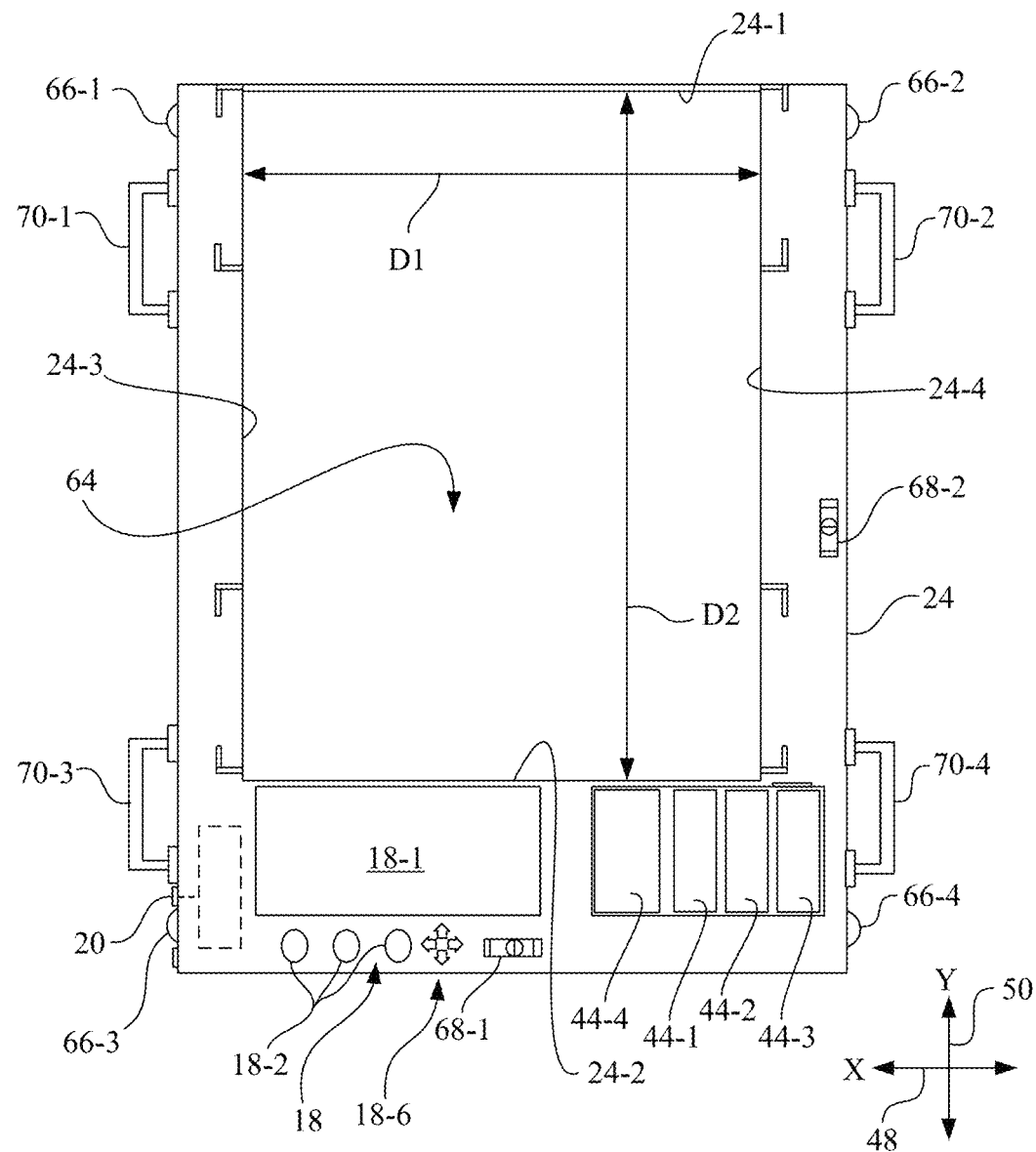
FIG. 6 is a top view of the portable large format inkjet printer of FIG. 1, wherein the printhead carrier system depicted in FIG. 5 has been removed to more clearly see the alignment frame.

Referring also to FIG. 6, alignment frame 24 of portable large format inkjet printer 10 is shown with printhead carrier system 40 having been removed to aid in the understanding of the configuration of alignment frame 24. Alignment frame 24 is configured with an open frame architecture having an open interior window 64, e.g., rectangular, within which printhead carrier 52 and the plurality of inkjet printheads 42 are moved, and from which all printing occurs. (See also FIG. 1). Open interior window 64 is defined by lateral side walls 24-1, 24-2 and longitudinal side walls 24-3, 24-4. Longitudinal side wall 24-3 is spaced from longitudinal side wall 24-4 by a lateral distance D1 in X-direction 48, wherein longitudinal side walls 24-3, 24-4 are substantially parallel. Lateral side wall 24-1 is spaced from lateral side wall 24-2 by a longitudinal distance D2 in Y-direction 50, wherein lateral side walls 24-1, 24-2 are substantially parallel. As used herein, the term "substantially parallel" means parallel or a deviation from parallel within a range of ±2 degrees. Referring also to FIG. 5, longitudinal guide members 58-1, 58-2 of printhead carrier system 40 of inkjet print engine 22 are fixedly mounted, e.g., by fasteners, such as bolts, screws, welds, adhesive, etc., to longitudinal side walls 24-3, 24-4 of alignment frame 24.

The open area of open interior window 64 of alignment frame 24 having dimensions D1×D2 is referred to herein as the field-of-view of alignment frame 24. By way of example only, the length of dimension D1 may be in a range of two to three feet (0.61 to 0.91 meters), and the length of dimension D2 may be in a range of three to four feet (0.91 to 1.22 meters). In the present embodiment, the field-of-view D1×D2 of alignment frame 24 is slightly larger than the resident print area P1×P2 of portable large format inkjet printer 10. As used herein, the term "slightly larger" means in a range of 0.5 percent to 10.0 percent larger.

Referring again to FIGS. 1-3 and 6, portable large format inkjet printer 10 has a set of four legs 66-1, 66-2, 66-3, 66-4, with each being respectively attached to alignment frame 24 near one of the four corners of alignment frame 24. Each of the plurality of legs 66-1, 66-2, 66-3, 66-4 has a free end configured to contact the stationary flat media 14 to space inkjet print engine 22 away from media print area 12. At least one of the plurality of legs 66-1, 66-2, 66-3, 66-4, is configured as a screw-type height adjuster, such as that used to level furniture, so as to permit compensation for an irregular surface of stationary flat media 14, such that portable large format inkjet printer 10 is level relative to the lateral and longitudinal extent of media print area 12 of stationary flat media 14.

To aid in leveling portable large format inkjet printer 10 relative to stationary flat media 14, attached to alignment frame 24 is a pair of bubble levels 68-1, 68-2.

Also, to aid in the manual positioning of portable large format inkjet printer 10 relative to media print area 12 of stationary flat media 14, portable large format inkjet printer 10 includes a set of side handles 70-1, 70-2, 70-3, and 70-4, with each being respectively attached to a side wall of alignment frame 24 near one of the four corners of alignment frame 24. Side handles 70-1, 70-2, 70-3, and 70-4 are configured to be grasped by one or more users in positioning portable large format inkjet printer 10 relative to media print area 12 of stationary flat media 14.

Referring again to FIG. 1, portable large format inkjet printer 10 has at least one alignment panel mounted to alignment frame 24, and positioned within the field-of-view of alignment frame 24 in open interior window 64. In the embodiment shown in FIG. 1, there is shown three alignment panels, namely: an alignment panel 72, an alignment panel 74, and an alignment panel 76. Each of alignment panel 72, alignment panel 74, and alignment panel 76 may be formed from a transparent plastic, e.g., plate, material and are rectangular in shape. Each respective alignment panel 72, 74, 76 has an alignment indicia configured to facilitate accurate manual positioning of portable large format inkjet printer 10 at a desired printing position at media print area 12.

Alignment panel 72 is mounted to, and adjacent, lateral side wall 24-1 of alignment frame 24. Alignment panel 72 has an alignment indicia 72-1 that is offset from an interior edge of alignment panel 72, which in the present embodiment, is in the form of a symbol, e.g., a cross, located in a central portion (along the X-direction 48) of alignment panel 72. Alignment indicia 72-1 is located at a respective fixed position within the field-of-view of open interior window 64 of alignment frame 24.

Alignment panel 74 is mounted to, and adjacent, longitudinal side wall 24-3 of alignment frame 24. Alignment panel 74 has an alignment indicia 74-1 that is offset from an interior edge of alignment panel 74, which in the present embodiment, is in the form of a symbol, e.g., a cross, located in a proximal end portion of longitudinal side wall 24-3. Alignment indicia 74-1 is located at a respective fixed position within the field-of-view of open interior window 64 of alignment frame 24.

Alignment indicia 72-1 is offset, in a rectilinear sense, from alignment indicia 74-1 in both the X-direction 48 and the Y-direction 50, and thus collectively, alignment indicia 72-1 and alignment indicia 74-1 may be used to align alignment frame 24, and in turn the entirety of portable large format inkjet printer 10, at the desired lateral, longitudinal, and rotational orientation with respect to media print area 12 to achieve a desired printing position at media print area 12 of stationary flat media 14.

Alternatively, one or more of the orthogonal interior edges of alignment panel 72 and/or alignment panel 74, within a field-of-view D1×D2 of the open interior window 64 of alignment frame 24, may be used to facilitate accurate manual positioning of portable large format inkjet printer 10 at the desired printing position at media print area 12.

Alignment panel 76 is mounted to, and is adjacent, lateral side wall 24-2 of alignment frame 24. Alignment panel 76 may be mounted to alignment frame 24 using a set of four bracket holders 78-1, 78-2, 78-3, 78-4. An alternative position for alignment panel 76 is defined by a second set of four bracket holders 80-1, 80-2, 80-3, 80-4. Alignment panel 76 has a pair of alignment indicia 76-1, 76-2. In the present embodiment, alignment indicia 76-1 is offset from an interior edge of alignment panel 76, and is in the form of a symbol, e.g., a cross, located in a central portion (along the X-direction 48) of alignment panel 76. Alignment indicia 76-2 is offset from an interior edge of alignment panel 72, and is in the form of a cross located near a right lower corner of alignment panel 76. Each of alignment indicia 76-1 and alignment indicia 76-2 is located at a respective fixed position within a field-of-view of open interior window 64 of alignment frame 24. Alignment indicia 76-1 is offset, in a rectilinear sense, from alignment indicia 76-2 in both the X-direction 48 and the Y-direction 50.

Alignment panel 76 may be used to supplement alignment indicia 72-1 and/or alignment indicia 74-1, or alternatively, may be used instead of alignment indicia 72-1 and/or alignment indicia 74-1. Thus, alignment indicia 76-1 and alignment indicia 76-2 may be used to align alignment frame 24, and in turn the entirety of portable large format inkjet printer 10, at the desired lateral, longitudinal, and rotational orientation with respect to media print area 12 to achieve a desired printing position at media print area 12 of stationary flat media 14.

Portable large format inkjet printer 10 may include a supplemental fine adjustment mechanism 82 (see FIG. 2), such as a set of horizontal screw devices, to aid in making a fine adjustment of the orientation of align alignment frame 24 with media print area 12 of stationary flat media 14. Such fine adjustment mechanism may be, for example, interposed between each of the plurality of legs 66-1, 66-2, 66-3, 66-4 and alignment frame 24 to aid in making final fine lateral, longitudinal, and/or rotational adjustments of portable large format inkjet printer 10 relative to media print area 12 of stationary flat media 14.

Figure 7:
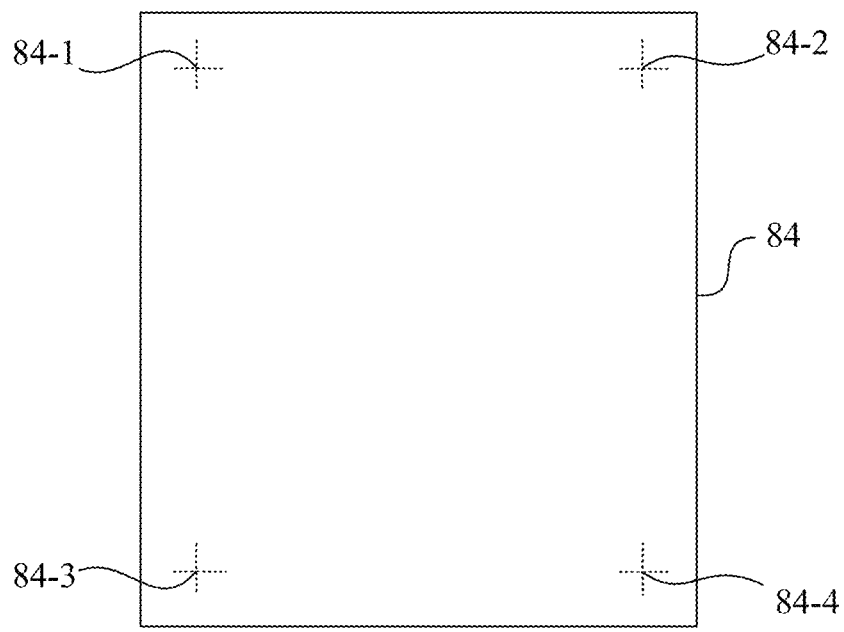
FIG. 7 is a top view of a single transparent alignment panel configured to be mounted to the alignment frame and cover an entirety of an open interior window defined by the alignment frame.

Referring now to FIG. 7, as an alternative to using one or more of alignment panels 72, 74, 76, there is shown a single transparent alignment panel 84, which may be mounted to alignment frame 24 to cover an entirety of open interior window 64 of the alignment frame 24, wherein the plurality of inkjet printheads 42 are interposed between alignment panel 84 and media print area 12. Alignment panel 84 will have at least two alignment indicia, and preferably four alignment indicia 84-1, 84-2, 84-3, 84-4, located within the field-of-view of open interior window 64 of alignment frame 24, and each located in a respective corner portion of alignment panel 84. Each of alignment indicia 84-1, 84-2, 84-3, 84-4 is in the form of a symbol, e.g., a cross. Referring again to FIG. 1, alignment panel 84 is mounted to alignment frame 24 using bracket holders 80-1, 80-2 and 78-3, 78-4.

The operation of portable large format inkjet printer 10 will now be described in printing image 26 of FIG. 8 on media print area 12 of stationary flat media 14.

If the resident print area P1×P2 of portable large format inkjet printer 10 is greater than or equal to media print area 12, portable large format inkjet printer 10 is manually positioned and aligned at media print area 12. Then, controller 16 will execute program instructions to process the image data representing image 26 to size image 26 to fit within media print area 12. Thereafter, the controller 16 will execute program instructions to operate inkjet print engine 22 to print image 26 at media print area 12 of stationary flat media 14.

Figure 9:
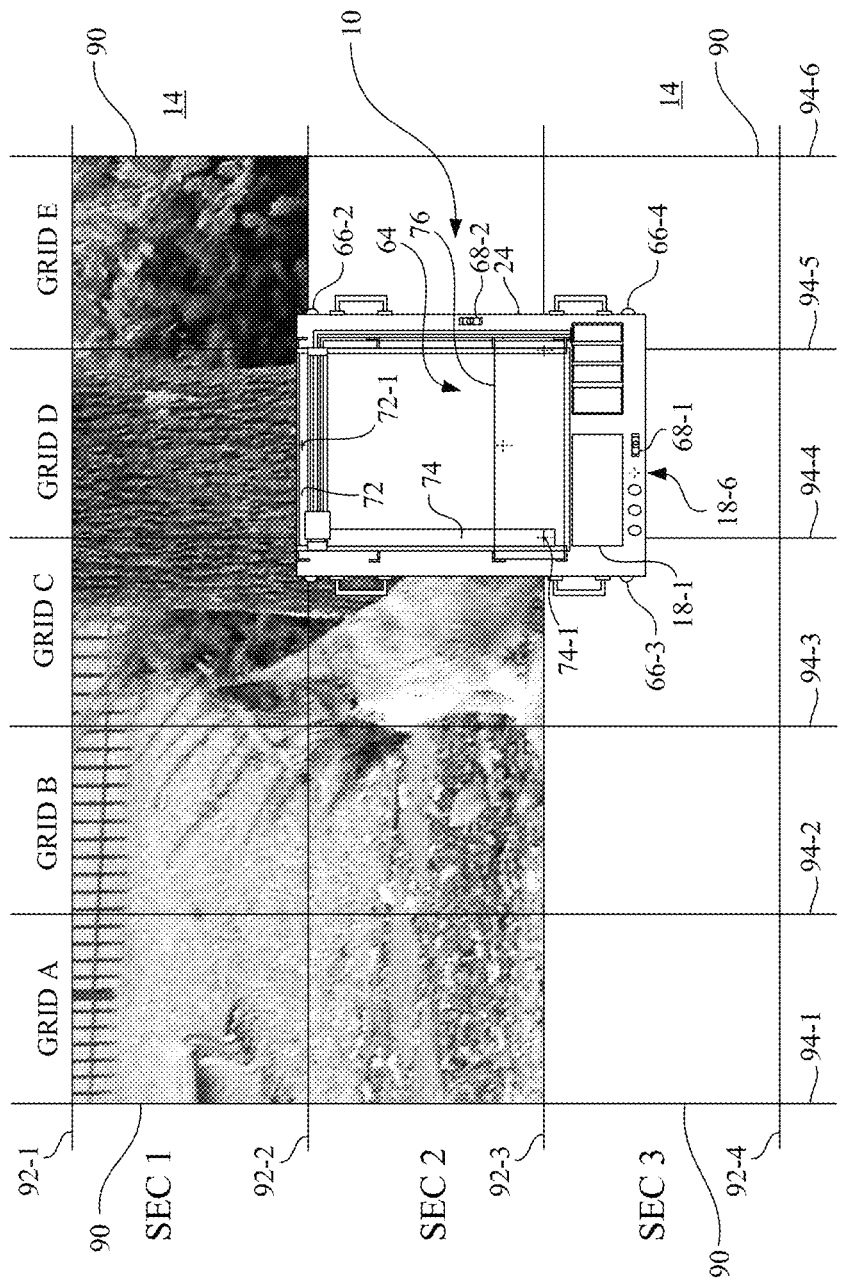
FIG. 9 is a graphical depiction of a method of printing the image of FIG. 8 at a media print area of a stationary flat media, wherein the resident print area of the portable large format inkjet printer of FIG. 1 is smaller than the media print area of a stationary flat media.

However, with reference to FIG. 9, in the event that the resident print area P1×P2 of portable large format inkjet printer 10 is smaller than the media print area, as in the media print area 90 of the imaging example of FIG. 9, then further manual positioning of portable large format inkjet printer 10 relative to media print area 90, and further processing of the image data representing image 26, is required.

In the example of FIG. 9, media print area 90 of stationary flat media 14 is physically divided into a matrix of areas by a plurality of section lines 92-1, 92-2, 92-3, 92-4, that orthogonally intersect a plurality of grid lines 94-1, 94-2, 94-3, 94-4, 94-5, 94-6, thereby forming a plurality of rows (sections) that intersect with a plurality of columns (grids) to define a plurality of sectional print zone grids, i.e., image portion areas, with the individual rows being identified in the present example as rows SEC1, SEC2, and SEC3, and with the individual columns being identified as GRID A, GRID B, GRID C, GRID D, and GRID E. The section lines 92-1, 92-2, 92-3, 92-4, and a plurality of grid lines 94-1, 94-2, 94-3, 94-4, 94-5, 94-6 may be physically formed on media print area 90 of stationary flat media 14, using chalk, graphite, or some other suitable marking material.

In addition, controller 16 executes program instructions to divide the image data representing image 26 into image data portions corresponding to the plurality of sectional print zone grids formed at the intersections of rows SEC1, SEC2, and SEC3, and columns GRID A, GRID B, GRID C, GRID D, and GRID E of media print area 90. Controller 16 further executes program instructions to control operation of the inkjet print engine 22 to print in sequence a respective image portion of image 26 at each sectional print zone grid of the plurality of sectional print zone grids, with portable large format inkjet printer 10 being manually relocated prior to the printing of a next image position.

More particularly, prior to printing, portable large format inkjet printer 10 is positioned and aligned at a first sectional print zone grid to be printed. If necessary, portable large format inkjet printer 10 may be leveled by adjusting the length of one or more of legs 66-1, 66-2, 66-3, 66-4. In this example, the first sectional print zone grid is at SEC1, GRID A. Portable large format inkjet printer 10 is positioned over sectional print zone grid SEC1, GRID A, and is aligned by positioning alignment frame 24 such that when the user looks through open interior window 64 toward stationary flat media 14, alignment indicia 72-1 intersects section line 92-1 and alignment indicia 74-1 intersects grid lines 94-1 of the pre-formed grid pattern.

The user now initiates a print start command at user interface 18, and controller 16 responds by executing program instructions to operate inkjet print engine 22 to print a corresponding image portion at sectional print zone grid SEC1, GRID A. Once the printing of the image portion at sectional print zone grid SEC1, GRID A is complete, then the user manually moves and positions portable large format inkjet printer 10 at a next sectional print zone grid to be printed, e.g., one of sectional print zone grid SEC2, GRID A or sectional print zone grid SEC1, GRID B adjacent sectional print zone grid SEC1, GRID A, and the alignment and printing process is repeated.

Thus, the alignment and printing process described above will be repeated until all of the plurality of sectional print zone grids is printed, and a full image corresponding to the image 26 of FIG. 8 is printed at the media print area 90 of stationary flat media 14 depicted in FIG. 9.

As an alternative to physically forming grid lines at the media print area 90, one or more interior edges of alignment panels 72, 74 may be used to align with a print edge of a previously printed image portion. As a further alternative, each previously printed image portion may include an alignment pattern, e.g., one or more symbols, such as a circle, dot, star, cross, etc., that is printed directly on media print area 90 near an image portion edge, and then used as a target for positioning alignment frame 24, wherein alignment frame 24 is manually manipulated until the appropriate alignment indicia is/are properly aligned with the printed alignment pattern. As used herein, the term "alignment mark" will be used to collectively refer to the above-described alignment pattern or image edge portion used for alignment.

Figure 10:
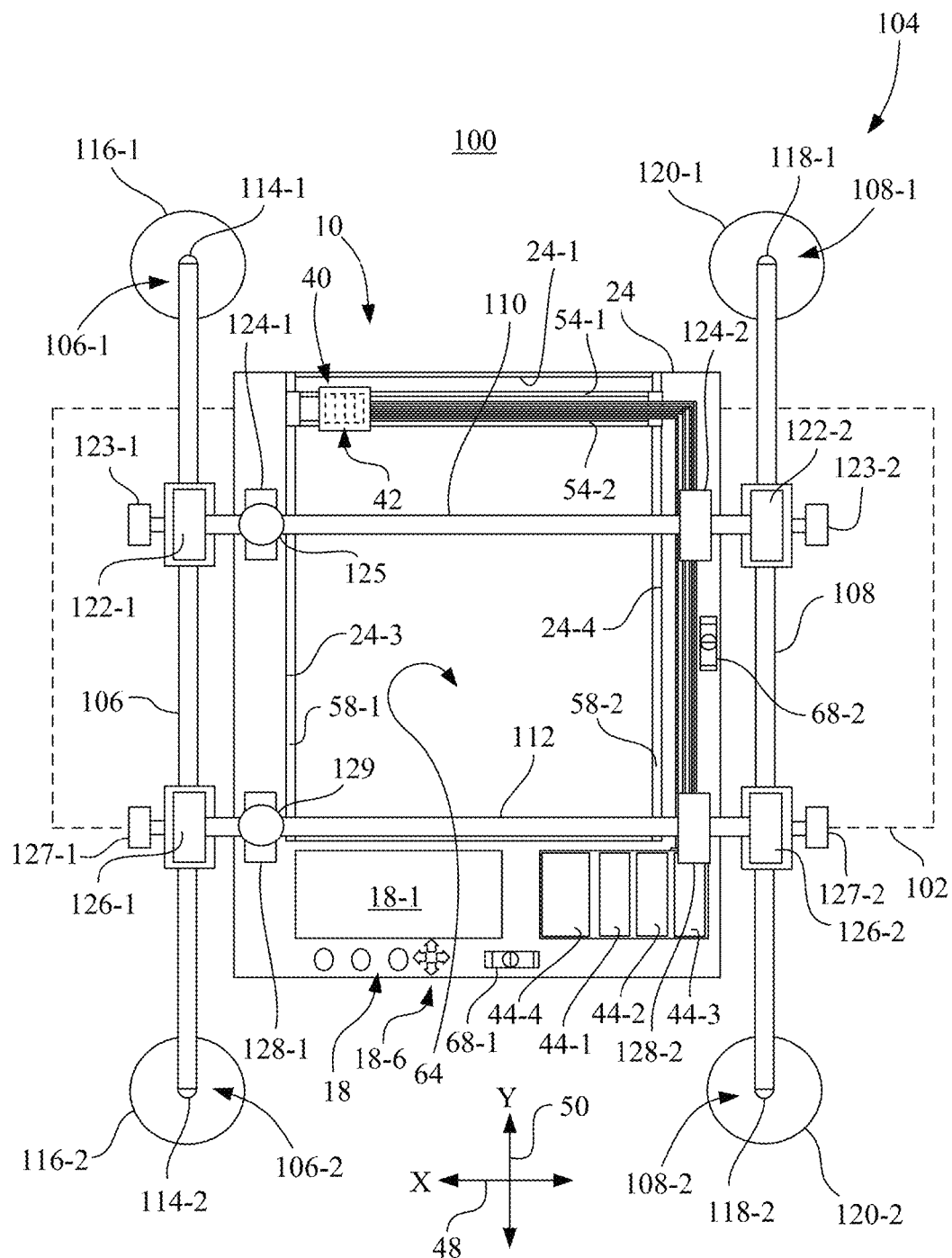
FIG. 10 is a top view of another embodiment, wherein the portable large format inkjet printer of FIG. 1 is adapted for printing on a vertically oriented flat media.

FIG. 10 shows another embodiment, wherein portable large format inkjet printer 10 is adapted for printing on a vertically oriented flat media 100, such as a wall, fence, retaining structure, shipping container, etc. As used herein, the term vertically oriented means a surface oriented at an angle in a range of 0 degrees to 65 degrees from vertical. However, it is to be understood that portable large format inkjet printer 10 of the present embodiment may print on any stationary flat media surface oriented in a range of horizontal through vertical. Identified on vertically oriented flat media 100 is a media print area 102.

In summary, as discussed above, alignment frame 24 of portable large format inkjet printer 10 is configured to fixedly mount the inkjet print engine 22 to facilitate a manual movement of the alignment frame 24 and the inkjet print engine 22 in unison. Alignment frame 24 has an open interior window 64 within which the plurality of inkjet printheads 42 are moved and from which all printing occurs. Controller 16 is configured to execute program instructions to control operation of each of the printhead carrier system 40 and one or more of the plurality of inkjet printheads 42 in printing an image at a media print area, e.g., media print area 102 of vertically oriented flat media 100.

In accordance with the embodiment of FIG. 10, portable large format inkjet printer 10 is attached to a vertical printing adapter 104. In particular, vertical printing adapter 104 is connected to alignment frame 24 at multiple connection points.

Vertical printing adapter 104 has a first longitudinal strut 106, a second longitudinal strut 108, a first lateral strut 110, and a second lateral strut 112.

First longitudinal strut 106 has opposed free ends 106-1, 106-2. A pair of legs 114-1, 114-2 is connected to first longitudinal strut 106, and legs 114-1, 114-2 are spaced apart along the length of first longitudinal strut 106, e.g., at or near the opposed free ends 106-1, 106-2 of first longitudinal strut 106. Each of the pair of legs 114-1, 114-2 has a suction cup mount 116-1, 116-2 configured to provide releasable suction attachment to vertically oriented flat media 100.

Second longitudinal strut 108 has opposed free ends 108-1, 108-2. A pair of legs 118-1, 118-2 is connected to second longitudinal strut 108, and legs 118-1, 118-2 are spaced apart along the length of the second longitudinal strut 108, e.g., at or near the opposed free ends 108-1, 108-2 of second longitudinal strut 108. Each of the pair of legs 118-1, 118-2 has a suction cup mount 120-1, 120-2 configured to provide releasable suction attachment to vertically oriented flat media 100. Second longitudinal strut 108 is laterally spaced from first longitudinal strut 106 in X-direction 48, with the alignment frame 24 being located between first longitudinal strut 106 and second longitudinal strut 108.

First lateral strut 110 is slidably connected to each of first longitudinal strut 106 and second longitudinal strut 108 via a respective slide collar 122-1, 122-2. Each of slide collars 122-1, 122-2 has a hand screw with locking nut arrangement 123-1, 123-2 adapted to respectively engage first longitudinal strut 106 and second longitudinal strut 108 to releasably lock the position of first lateral strut 110 relative to first longitudinal strut 106 and second longitudinal strut 108 in Y-direction 50. First lateral strut 110 is slidably connected to alignment frame 24 at two spaced locations via slide collars 124-1, 124-2. At least one of slide collars 124-1, 124-2 has a hand screw with locking nut arrangement 125 adapted to respectively engage first lateral strut 110 to releasably lock the position of alignment frame 24 relative to first lateral strut 110 in X-direction 48.

Second lateral strut 112 is slidably connected to each of first longitudinal strut 106 and second longitudinal strut 108 via a respective slide collar 126-1, 126-2. Each of slide collars 126-1, 126-2 has a hand screw with locking nut arrangement 127-1, 127-2 adapted to respectively engage first longitudinal strut 106 and second longitudinal strut 108 to releasably lock the position of second lateral strut 112 relative to first longitudinal strut 106 and second longitudinal strut 108 in Y-direction 50. Second lateral strut 112 is slidably connected to alignment frame 24 at two spaced locations via slide collars 128-1, 128-2. At least one of slide collars 128-1, 128-2 has a hand screw with locking nut arrangement 129 adapted to respectively engage second lateral strut 112 to releasably lock the position of alignment frame 24 relative to second lateral strut 112 in X-direction 48.

Alignment of portable large format inkjet printer 10 using vertical printing adapter 104 may be accomplished using one or more of alignment panels 72, 74, 76, or single alignment panel 84, using the techniques described above. However, once vertical printing adapter 104 is attached to media print area 102 of vertically oriented flat media 100 via suction cup mounts 116-1, 116-2, 120-1, 120-2, any further lateral, longitudinal, or rotational positioning of portable large format inkjet printer 10 relative to media print area 102 at the present location is accomplished by sliding portable large format inkjet printer 10 along one or more of first longitudinal strut 106, second longitudinal strut 108, first lateral strut 110, and second lateral strut 112.

Figure 11A:
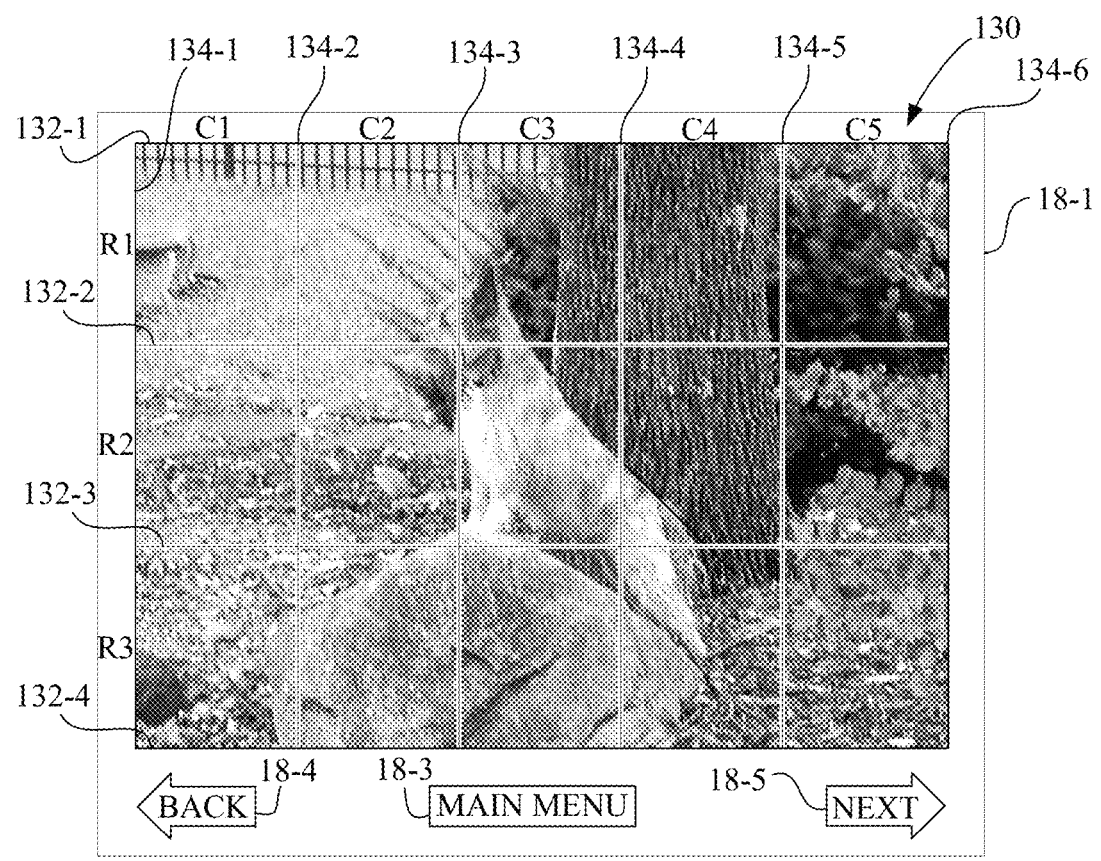
FIG. 11A depicts a touch screen display of the large format inkjet printer of FIG. 1, displaying a selected image superposed with an output image grid.
Figure 11B:
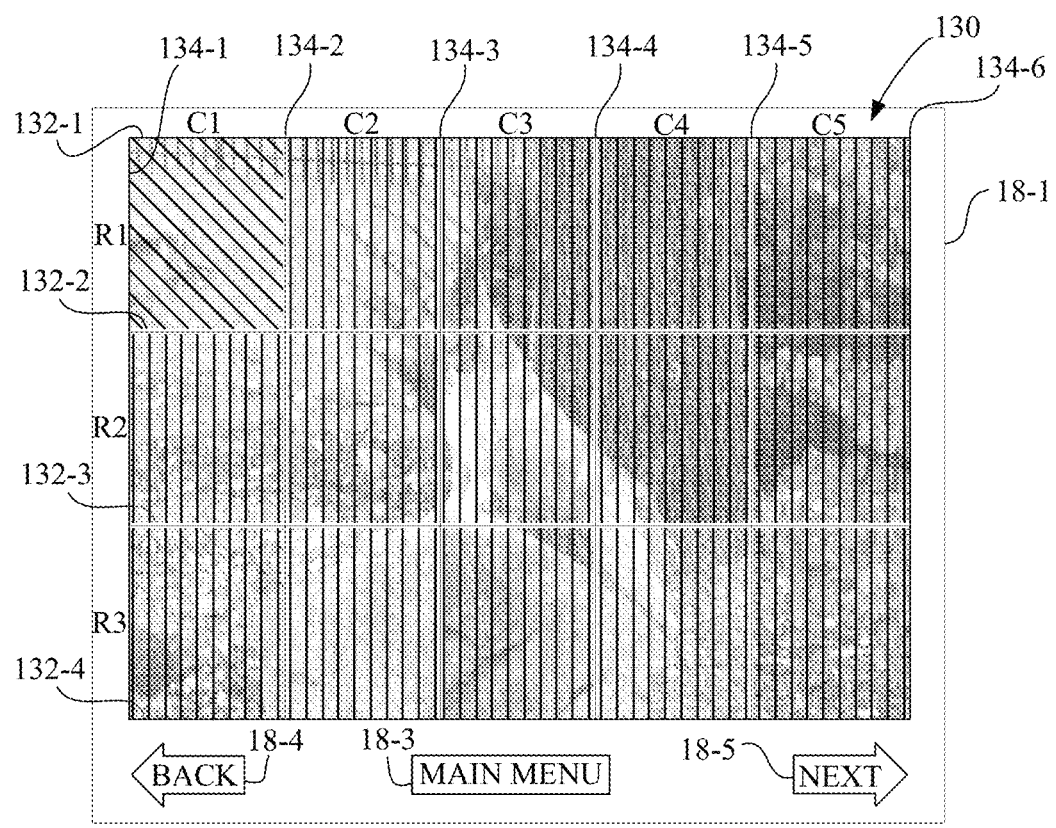
FIG. 11B depicts the touch screen display displaying the selected image superposed with the output image grid, and with green shading (represented by convention as diagonal lines) added to indicate a next output image area portion available for printing, and with the remainder of the output image area portions being shaded red (represented by convention as vertical lines) to indicate current non-availability for printing.
Figure 11C:
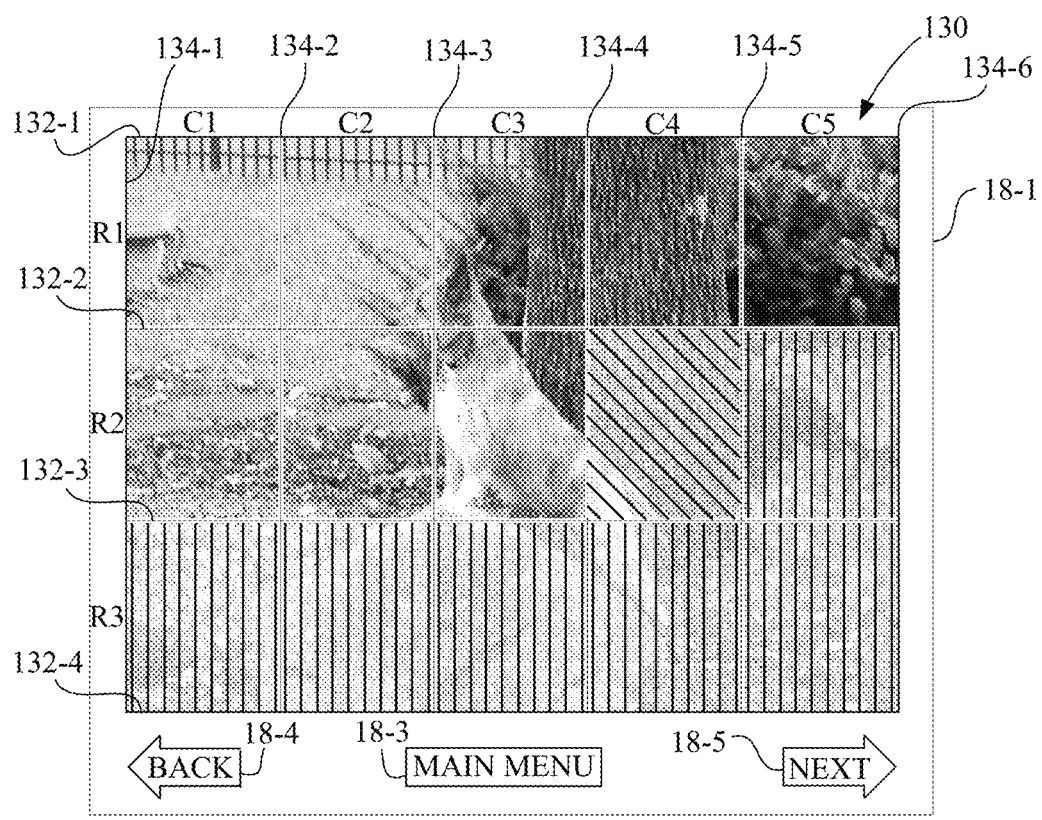
FIG. 11C depicts the touch screen display displaying the selected image superposed with the output image grid, after eight output image area portions have been printed (represented as clear, unobscured by shading), with the next output image area portion to be printed indicated by the green shading (represented by convention as diagonal lines), and with the remainder of the output image area portions not currently available for printing being shaded red (represented by convention as vertical lines).
Figure 12A:
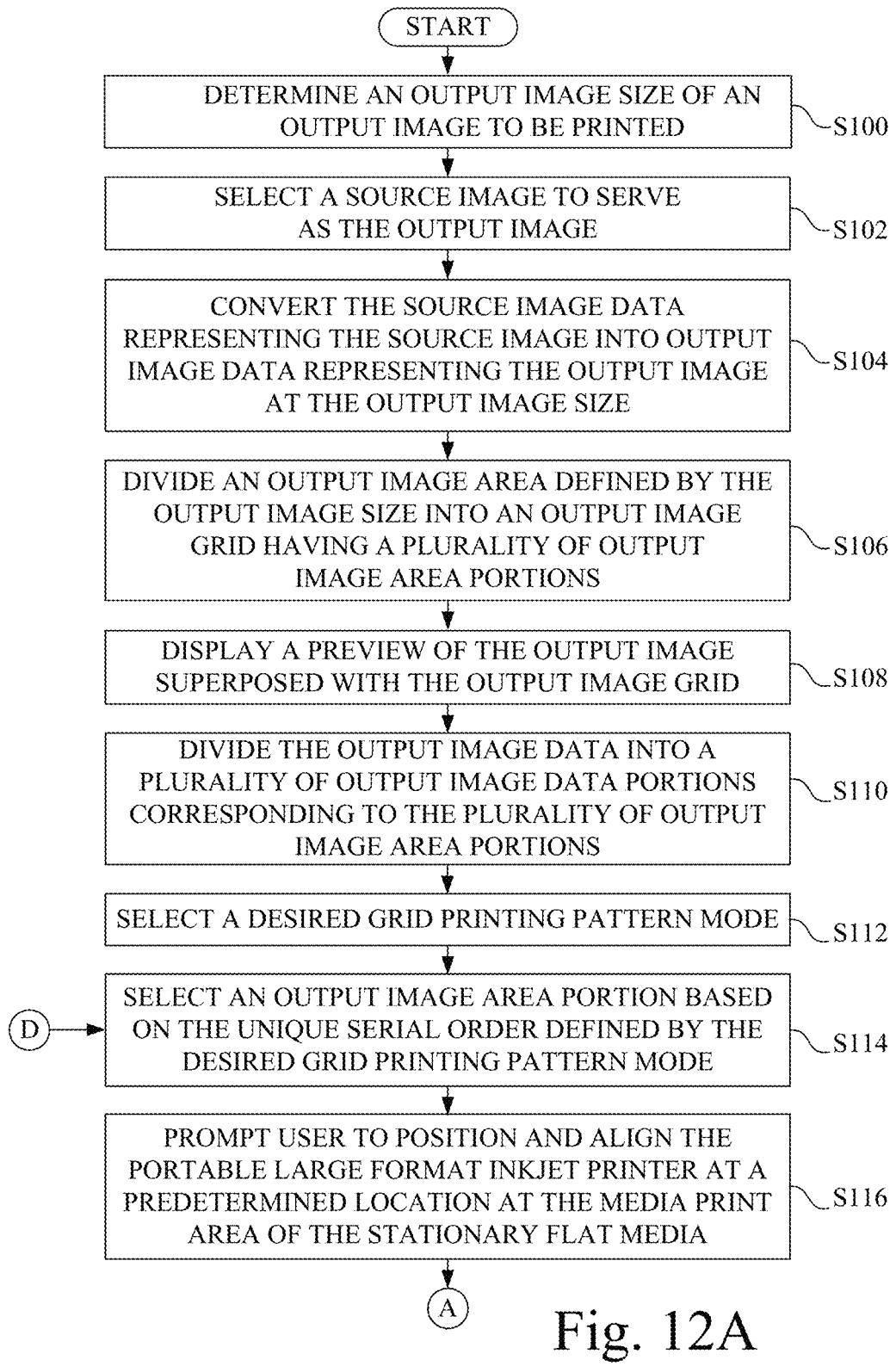
FIGS. 12A and 12B form a flowchart depicting a method for operating the portable large format inkjet printer of FIG. 1 for printing an image at a media print area of a stationary flat media.
Figure 12B:
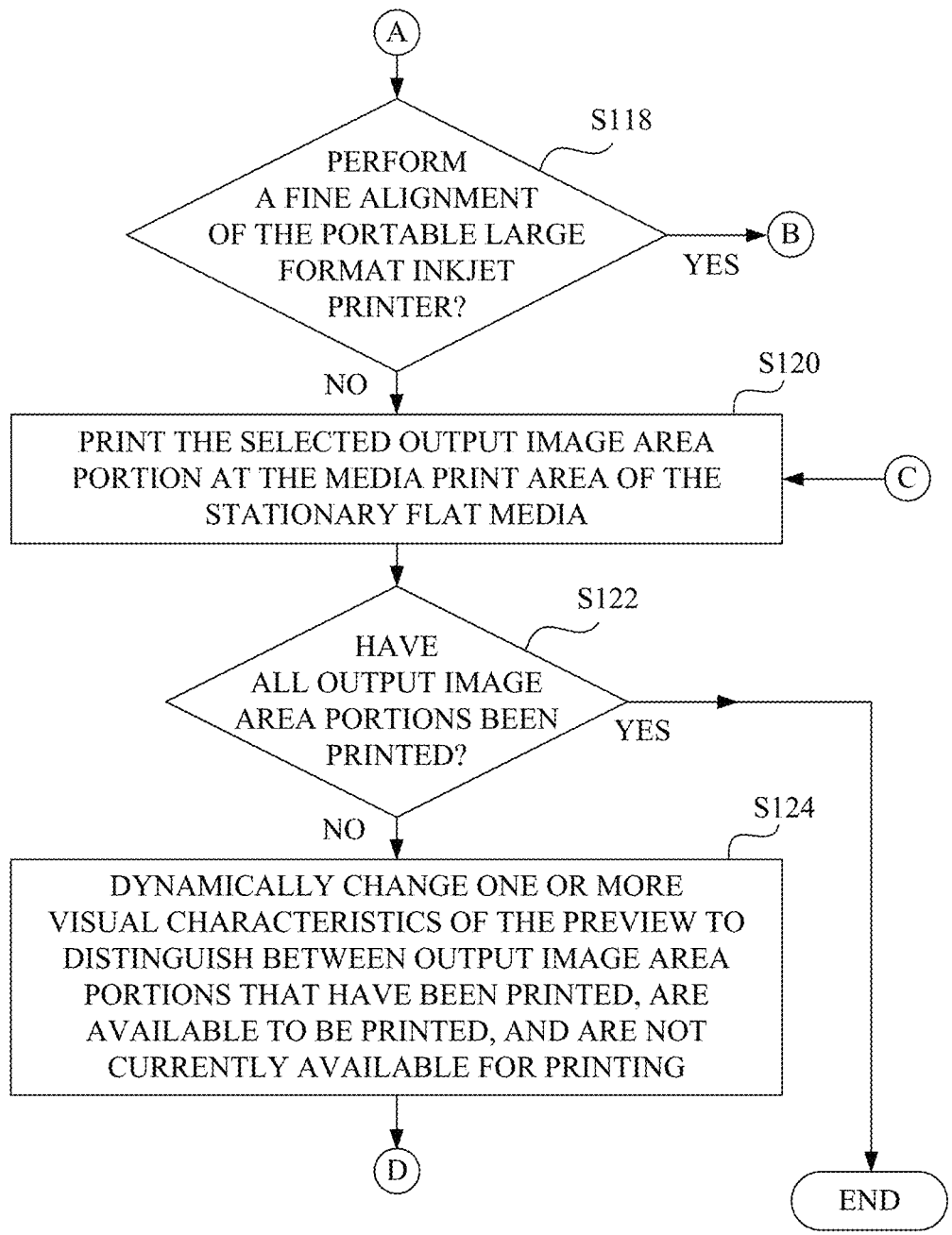

Referring to FIGS. 11A-11C in conjunction with FIG. 1, touch screen display 18-1 of user interface 18 may be configured with a plurality of menu screens to aid in operating portable large format inkjet printer 10, and for facilitating a method for operating a portable large format inkjet printer for printing an image at a media print area of a stationary flat media, as depicted in FIGS. 12A and 12B.

As shown in FIGS. 11A-11C, touch screen display 18-1 displays a selected image, e.g., image 26 depicted in FIG. 8, and includes command selection icons, such as for example, Main Menu 18-3, Back 18-4, and Next 18-5.

In the present example, with particular reference to FIG. 11A, touch screen display 18-1 displays the selected image 26 depicted in FIG. 8 being superposed with an output image grid 130 to represent a division of the output image 26 and the corresponding output image data for printing. Output image grid 130 has a plurality of section lines (horizontally oriented) 132-1, 132-2, 132-3, 132-4, and a plurality of grid lines (vertically oriented) 134-1, 134-2, 134-3, 134-4, 134-5, 134-6 that define a matrix having a plurality of output image area portions (15 shown) identified by row coordinates R1, R1, R3 and column coordinates C1, C2, C3, C4, and C5. In the present example, output image grid 130 defines rows R1, R1, R3 and columns C1, C2, C3, C4, and C5, which directly correspond to the rows SEC1, SEC2, and SEC3, and columns GRID A, GRID B, GRID C, GRID D, and GRID E of media print area 90 of FIG. 9.

As shown in FIGS. 11B and 11C, during the printing process, the color shading and/or transparency/opacity of the various output image area portion may be changed to distinguish between a subset of the plurality of output image area portions that has been printed, a subset of the plurality of output image area portions that is available to be printed, and a subset of the plurality of output image area portions that is not currently available for printing.

FIG. 11B shows touch screen display 18-1 prior to any printing, wherein a current print location available for printing is indicated by shading the output image area portion green (represented by convention as diagonal lines) and, as an alternative or supplemental to shading, may be indicated as a change in the opacity/transparency of the output image area portion. In particular, FIG. 11B shows touch screen display 18-1 with output image area portion R1, C1 shaded green, and with a remainder of the output image area portions that are not currently available for printing being shaded red (represented by convention as vertical lines), and with a transparency/opacity change applied to all blocks.

FIG. 11C shows touch screen display 18-1 after eight output image area portions have been printed, e.g., the entire row R1, and blocks R2, C1; R2, C2, and R2, C3 (represented as clear, unobscured by shading), with the next output image area portion to be printed as output image area portion R2, C4, as indicated by the green shading (represented by convention as diagonal lines) and with a change in transparency/opacity, and with the remainder of the output image area portions not currently available for printing, i.e., R2, C5 and the entirety of row R3, being shaded red (represented by convention as vertical lines) and with a change in transparency/opacity.

Thus, one or more visual characteristics of the preview of the output image superposed with the output image grid 130 displayed at touch screen display 18-1 is dynamically changed during the printing process to distinguish between a subset of the plurality of output image area portions that has been printed (clear, not obscured); a subset of the plurality of output image area portions that is available to be printed (e.g., indicated by green shading (represented by convention as diagonal lines)); and a subset of the plurality of output image area portions that is not currently available for printing (e.g., indicated by red shading (represented by convention as vertical lines)).

FIGS. 12A and 12B form a flowchart depicting a method for operating portable large format inkjet printer 10 for printing an image at a media print area of a stationary flat media, such as media print area 90 of stationary flat media 14 depicted in FIG. 9.

At step S100, a determination is made as to an output image size, i.e., dimensions, of an output image to be printed at media print area 90 of stationary flat media 14 (see also FIG. 9). The determination will be limited by the size of media print area 90, wherein the maximum output image size is equal to or less than the dimensions of the media print area 90. For example, if the media print area 90 is 30 feet×50 feet, then the maximum size for the output image size for image 26 will be 30 feet×50 feet. However, the output image size can always be smaller than the size of media print area 90. Also, in the present example, the output image size defines an output image area that is larger than the resident print area of portable large format inkjet printer 10.

At step S102, a source image to serve as the output image is selected. The output image, when printed, will correspond in visual content to the source image. In the present example, the source image will be image 26 of FIG. 8. For example, image 26 may be one of a plurality of images stored in memory circuit 30, or in another such non-transitory memory of a device communicatively coupled to image data input interface 20, e.g., memory of a laptop computer, optical disc drive (DVD), memory card, USB memory drive, etc. During the selection process, for example, a user may use user interface 18, in conjunction with program instructions executed by controller 16, to display on touch screen display 18-1 thumbnail pictures corresponding to the plurality of images stored in memory, such as in memory circuit 30, from which the selection is made. The user may then select the desired image by touching the corresponding thumbnail picture displayed on touch screen display 18-1.

At step S104, source image data representing the source image 26 is converted to output image data representing the output image at the output image size, e.g., by scaling. For example, assume that the original size of the source image is 2400×1800 pixels, and the desired output image size is 9600×9600 pixels. Controller 16 executes program instructions to inform the user, via user interface 18, that the 4:3 aspect ratio of the original image cannot be preserved to print at 9600×9600 pixels, and the user is then provided with a choice as whether to preserve the aspect ratio and re-size the output image size to 9600×7200 pixels, or to stretch the source image to 9600×9600 pixels.

In addition to such data scaling, controller 16 executes program instructions to select the appropriate data format for printing by portable large format inkjet printer 10, as well as to perform decompression, color conversion, and error diffusion functions, if necessary and/or desired.

At step S106, controller 16 executes program instructions to divide an output image area defined by the output image size into a matrix grid, such as output image grid 130 (see, e.g., FIG. 11A), formed by the intersecting section lines (horizontally oriented) 132-1, 132-2, 132-3, 132-4, and grid lines (vertically oriented) 134-1, 134-2, 134-3, 134-4, 134-5, 134-6 to form a matrix having a plurality of output image area portions. Each output image area portion will be no larger than the resident print area of portable large format inkjet printer 10, and controller 16 takes the resident print area size of portable large format inkjet printer 10 into account when determining the number of output image area portions there will be in the matrix grid of output image grid 130.

In the example provided by FIGS. 11A-11C, the output image area defined by the output image size is divided into fifteen output image area portions, which for purposes of this example are individually identified by row coordinates R1, R2, or R3 and column coordinates C1, C2, C3, C4, or C5. This division also is used to define the division of media print area 90 as depicted in FIG. 9, and as more fully discussed above.

At step S108, controller 16 executes program instructions to display at touch screen display 18-1 of user interface 18 a preview of the output image superposed with output image grid 130 to represent the division of the output image and corresponding output image data for printing. The preview will appear as shown, for example, in FIG. 11A.

At step S110, controller 16 executes program instructions to divide the output image data into a plurality of output image data portions, wherein each output image data portion corresponds to a respective output image area portion of the plurality of output image area portions.

Figure 14A:
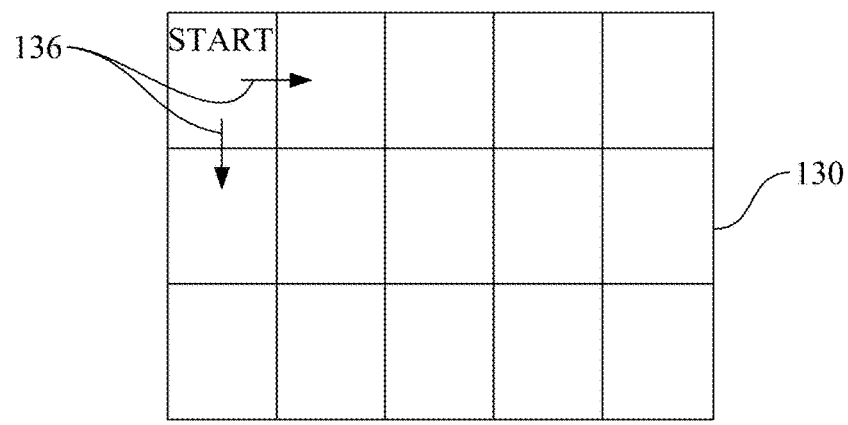
FIG. 14A depicts, with respect to output image grid shown in FIG. 11A, an example of a grid printing pattern mode in the form of a free-form grid printing pattern mode.
Figure 14B:
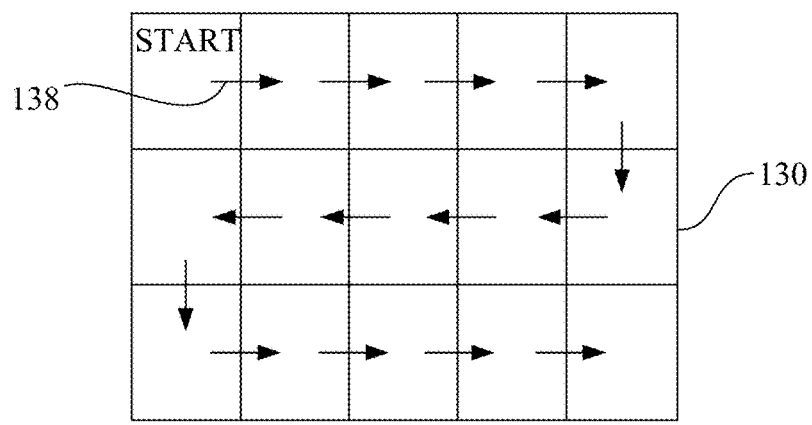
FIG. 14B depicts, with respect to output image grid shown in FIG. 11A, an example of a grid printing pattern mode in the form of a serpentine grid printing pattern mode.
Figure 14C:
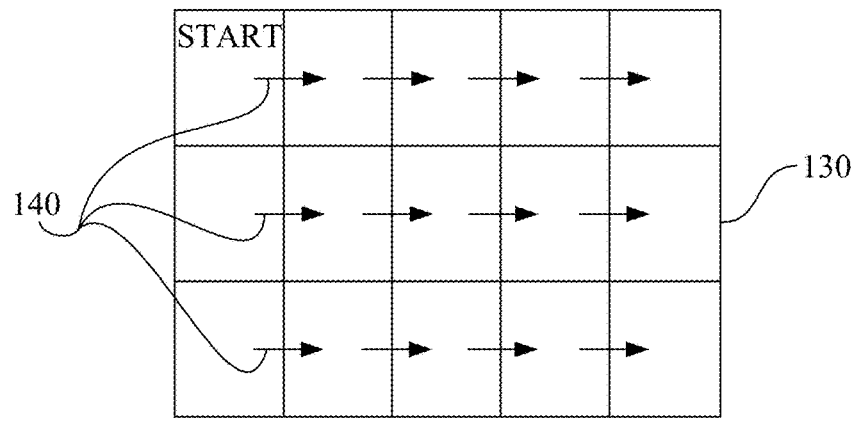
FIG. 14C depicts, with respect to output image grid shown in FIG. 11A, an example of a grid printing pattern mode in the form of a unidirectional grid printing pattern mode.

At step S112, a desired grid printing pattern mode is selected from a plurality of selectable grid printing pattern modes. FIGS. 14A-14C show three examples of grid printing pattern modes from which the desired grid printing pattern mode may be selected. In each of FIGS. 14A-14C, the direction of the arrow points to the next area to be printed, with each defining a unique serial order of printing.

Theoretically, the user may start at any output image area portion of the output image grid 130, but in practice, it may be more intuitive to start in a corner, such as in the upper left corner as depicted in the examples of FIGS. 14A-14C. However, is contemplated that the start may occur at one of the middle output image area portions of output image grid 130 if the output image is to be centered at media print area 90 of stationary flat media 14. Common to all modes, however, is that once started, the next output image area portion to be printed will be non-diagonally adjacent to a previously printed output image area portion.

FIG. 14A depicts, with respect to output image grid 130, a free-form grid printing pattern mode 136 with the Start, i.e., first output image area portion to be printed, being in the upper left corner. As indicated, the user may be provided with a choice as to whether the printing process will proceed horizontally or vertically in the orientation shown on touch screen display 18-1. Once started, the user will then, in a free-form fashion, select as the next output image area portion any block that is non-diagonally adjacent to a previously printed output image area portion.

Alternatively, as depicted in FIGS. 14B and 14C, it may be desirable to lock the user into a fixed pattern for the respective grid printing pattern mode.

FIG. 14B depicts, with respect to output image grid 130, a serpentine grid printing pattern mode 138 with the Start, i.e., first output image area portion to be printed, being in the upper left corner. As indicated, the printing process will proceed horizontally to the right, then down to the next row, and then the printing process will proceed horizontally to the left, and so forth. Once started, touch screen display 18-1 will guide the user to the next output image area portion to be printed.

FIG. 14C depicts, with respect to output image grid 130, a unidirectional grid printing pattern mode 140 with the Start, i.e., first output image area portion to be printed, being in the upper left corner. As indicated, the printing process will proceed horizontally to the right, then down to the next row, and return to full-left, and then the printing process will proceed horizontally to the right, and so forth. Once started, touch screen display 18-1 will guide the user to the next output image area portion to be printed.

Thus, each of the plurality of selectable grid printing pattern modes 136, 138, 140 defines a unique serial order of printing each of the plurality of output image area portions being displayed at touch screen display 18-1 of user interface 18. It is noted, however, that as to free-form grid printing pattern mode 136, the user interacts with the process to define the unique serial order of printing.

At step S114 of FIG. 12A, based on the unique serial order defined by the desired grid printing pattern mode selected at step S112, controller 16 executes program instructions to select the first (Start block), or next, output image area portion of the plurality of output image area portions for printing.

For example, assume that at step S112 the user selects the unidirectional grid printing pattern mode 140. At step S114, controller 16 will execute program instructions to select output image area portion R1, C1 of output image grid 130 as the Start block. For successive printing iterations, controller 16 will execute program instructions to select a next output image area portion of output image grid 130 to be printed, based on the desired grid printing pattern mode selected at step S112.

At step S116, controller 16 then executes program instructions to prompt the user to position and align portable large format inkjet printer 10 at a predetermined location at media print area 90 of stationary flat media 14 (see FIG. 9) that corresponds to the selected output image area portion. Such prompting may be in the form of a change in the visual impression of image 26 at touch screen display 18-1 of user interface 18, and may include supplemental textual and/or aural instructions regarding positioning and aligning. Alternatively, or supplemental, to using touch screen display 18-1 of user interface 18 to prompt a user to position and align portable large format inkjet printer 10, user interface 18 may include lighted arrows, such as lighted arrows 18-6, to indicate a left move, right move, down move, or up move as a prompt.

In the example depicted by in FIG. 11B, where unidirectional grid printing pattern mode 140 was selected at step S112, the Start bock is selected at step S114 as being in the upper left corner, output image area portion R1, C1, at step S116, controller 16 further executes program instructions to indicate an available printing location by shading the output image area portion R1, C1 green (represented by convention as diagonal lines) and may also modify the opacity/transparency of output image area portion R1, C1. Referring to FIG. 9, this would prompt the user to position and align portable large format inkjet printer 10 at sectional print zone grid SEC1, GRID A.

As shown in FIG. 11B, to further insure that the user positions and aligns portable large format inkjet printer 10 at the proper sectional print zone grid location at media print area 90 of stationary flat media 14, controller 16 may further execute program instructions to modify the visual impression of touch screen display 18-1 to indicate each output image area portion that is not currently available for printing. Thus, in the present example depicted in FIG. 11B, the output image area portions in the remainder of row R1, i.e., at row R1, columns C2-05 and the entireties of rows R2 and R3, are shaded red (represented by convention as vertical lines), and may also include a modification of the opacity/transparency, to indicate to the user that those output image area portions are currently unavailable, and thus to discourage the user from positioning and aligning portable large format inkjet printer 10 at any of the corresponding sectional print zone grids row SEC 1, GRID B-GRID E, and the entireties of rows SEC 2 and SEC 3, at media print area 90 of stationary flat media 14 of FIG. 9.

It is noted that in the present example, at this stage, all of the output image area portions of output image grid 130 have some form of either green shading or red shading, and all have modified transparency/opacity, to indicate to the user that none of the output image area portions has yet been printed.

At step S118 of FIG. 12B, the user decides whether to perform a fine alignment of portable large format inkjet printer 10 with the proper sectional print zone grid location at media print area 90 of stationary flat media 14.

In particular, controller 16 may execute program instructions to display at touch screen display 18-1 a prompt requesting the user to decide whether fine alignment is warranted. This determination may be based, in part, on how successful the user was in performing the manual alignment, i.e., the course alignment, at step S116. For example, due to a variety of factors, such as media type, printing environment, etc., it may not be feasible for the user to position portable large format inkjet printer 10 exactly at the desired printing position at the media print area.

If the decision at step S118 is YES, i.e., fine alignment is desired, then the user will input a fine alignment command at user interface 18, which is supplied to controller 16 of portable large format inkjet printer 10, which in turn may execute program instructions to invoke the fine alignment method depicted in FIG. 13, which will be discussed in more detail below.

If the decision at step S118 is NO, then the process proceeds to step S120.

At step S120, the selected output image area portion at media print area 90 of stationary flat media 14 is printed.

In particular, the user will input a print command at touch screen display 18-1 of user interface 18 to initiate printing. In turn, controller 16 processes the print command and executes program instructions to further process the corresponding output image data portion and to initialize printing of the selected output image area portion at media print area 90 of stationary flat media 14 by portable large format printer 10. In the example of FIG. 11B, the output image data portion corresponding to output image area portion R1, C1 is processed by controller 16 to control operation of inkjet print engine 22 to print the sectional print zone grid SEC 1, GRID A at media print area 90 of stationary flat media 14 of FIG. 9.

At step S122, it is determined whether all output image area portions have been printed.

If the decision at step S122 is YES, then printing is complete and the printing process ends.

However, if the decision at step S122 is NO, then the process proceeds to step S124.

At step S124, controller 16 executes program instructions to dynamically change at touch screen display 18-1 one or more visual characteristics of the preview of output image 26 superposed with output image grid 130 to distinguish between: a subset of the plurality of output image area portions that has been printed; a subset of the plurality of output image area portions that is available to be printed; and a subset of the plurality of output image area portions that is not currently available for printing, and the process returns to step S114.

At each subsequent iteration of step S114, based on the unique serial order defined by the desired grid printing pattern mode selected at Step S112, controller 16 executes program instructions to select the next output image area portion of the plurality of output image area portions for printing. In the present example, following printing of the sectional print zone grid SEC 1, GRID A at media print area 90 of stationary flat media 14 of FIG. 9 associated with output image area portion R1, C1 displayed at touch screen display 18-1, the next output image area portion to be selected is output image area portion R1, C2 corresponding to the sectional print zone grid SEC 1, GRID B at media print area 90 of stationary flat media 14 of FIG. 9.

Then, at step S116, where unidirectional grid printing pattern mode 140 was selected at step S112, output image area portion R1, C1 will be changed to unobscured, so as to indicate that this area has been printed. Next, output image area portion R1, C2 will be shaded green (represented by convention as diagonal lines), and the remainder of row R1, i.e., at row R1, C3-C5 and the entireties of rows R2 and R3, will remain shaded red (represented by convention as vertical lines) to indicate to the user that those output image area portions are currently unavailable, and thus to discourage the user from positioning and aligning portable large format inkjet printer 10 at any of the corresponding sectional print zone grids row SEC 1, GRIDS C-E, and the entireties of rows SEC 2 and SEC 3, at media print area 90 of stationary flat media 14 of FIG. 9.

In the example of FIG. 11C, as depicted in touch screen display 18-1 with reference to FIG. 9, the printing process has completed the printing of eight of the fifteen sectional print zone grids at media print area 90 of stationary flat media 14 of FIG. 9, and visual characteristics of the corresponding output image area portions of output image grid 130 have been changed. In particular, as shown at touch screen display 18-1 depicted in FIG. 11C, the visual characteristics of the preview of output image 26 superposed with output image grid 130 is dynamically changed during the printing process to distinguish between a subset of the plurality of output image area portions that has been printed (not obscured, e.g., entirety of row R1, and blocks R2, C1; R2, C2, and R2, C3); a subset of the plurality of output image area portions that is available to be printed (e.g., block R2, C4) indicated by green shading (represented by convention as diagonal lines), and as the next output image area portion to be printed; and a subset of the plurality of output image area portions that is not currently available for printing (e.g., R2, C5 and the entirety of row R3) indicated by red shading (represented by convention as vertical lines). Again, in accordance with step S116, this prompts the user to position and align portable large format inkjet printer 10 at the appropriate sectional print zone grid location, e.g., SEC 2, GRID D, at media print area 90 of stationary flat media 14 depicted in FIG. 9

Thus, acts of steps S114 through S124 are repeated for each of the plurality of output image area portions of output image grid 130 until an entirety of the output image area has been printed at media print area 90 of stationary flat media 14.

Figure 13:
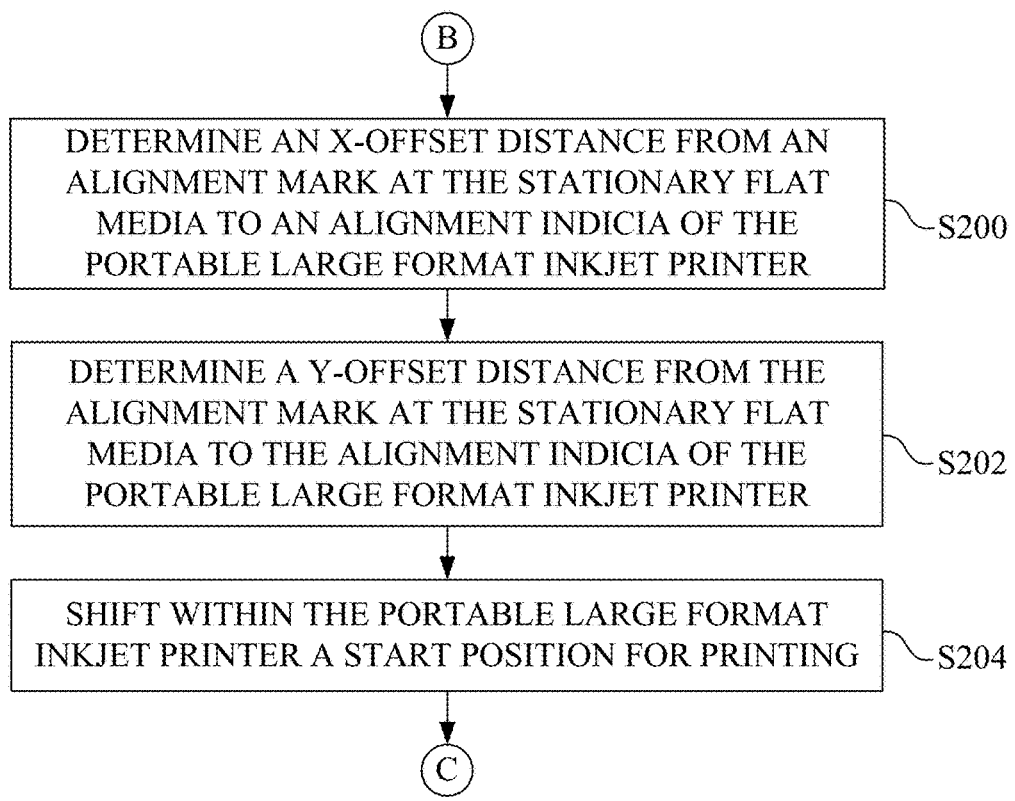
FIG. 13 is a flowchart depicting a method for providing a fine alignment of the portable large format inkjet printer of FIG. 1 with an alignment mark formed at the media print area of the stationary flat media.

Referring again to step S118 of FIG. 12B, if the decision at step S118 is YES, i.e., fine alignment is desired, then the user will input a fine alignment command at user interface 18, which is supplied to controller 16 of portable large format inkjet printer 10, which in turn may execute program instructions to invoke the fine alignment method depicted in FIG. 13.

Recall from FIGS. 1 and 7, discussed above, that portable large format inkjet printer 10 includes alignment indicia configured to facilitate accurate manual positioning and alignment of portable large format inkjet printer 10 at a desired printing position at media print area 12 of media print area 90. Due to a variety of factors, such as media type, printing environment, etc., may not be possible for the user to manually position portable large format inkjet printer 10 exactly at the desired printing position at the media print area. Thus, fine alignment may be desired.

Figure 15:
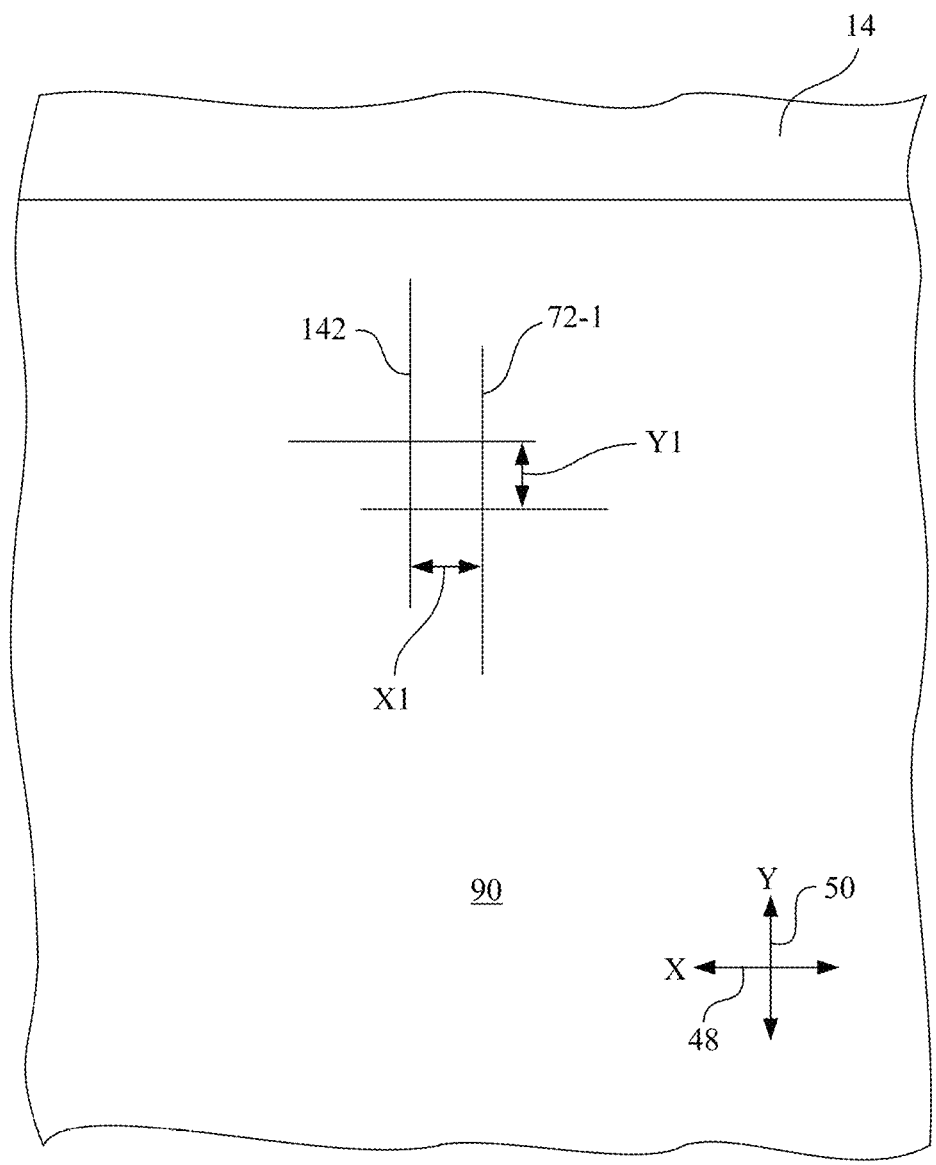
FIG. 15 shows an example of an alignment indicia of the portable large format inkjet printer of FIG. 1 not aligned with an alignment mark of the media print area of the stationary flat media, used in describing the fine alignment method of FIG. 13.

With reference to FIG. 1, portable large format inkjet printer 10 includes alignment panel 72 having alignment indicia 72-1, which is in the form of a cross. Referring also to FIG. 15, assume that media print area 90 of stationary flat media 14 includes an alignment mark 142, also in the form of a cross. As discussed above, fine alignment could be performed manually using fine adjust mechanism 82 by operating fine adjust mechanism 82 until alignment indicia 72-1 is in alignment with alignment mark 142, both in X-direction 48 and Y-direction 50.

Alternative, FIG. 13 provides a fine alignment method to determine the offset of the current position of portable large format inkjet printer 10 having alignment indicia 72-1 from the desired position having alignment mark 142, and then shifts the printing operation such that alignment indicia 72-1 is virtually, or physically, aligned with alignment mark 142.

Referring to FIG. 13 at step S200, in conjunction with FIG. 15, an X-offset distance X1 from an alignment mark 142 at the predetermined location at media print area 90 of stationary flat media 14 to alignment indicia 72-1 of portable large format inkjet printer 10 is determined.

This determination may be made by visual observation, with the user inputting X-offset distance X1 at user interface 18. Alternatively, it is contemplated that the determination may be made automatically, such as by initializing an optical sensor relative to alignment indicia 72-1, and then controlling a position of the optical sensor using the distance of X-direction motion of printhead carrier system 40 to determine the X-offset distance X1.

At step S202, a Y-offset distance from alignment mark 142 at the predetermined location at media print area 90 of stationary flat media 14 to alignment indicia 72-1 of portable large format inkjet printer 10 is determined.

This determination may be made by visual observation, with the user inputting Y-offset distance Y1 at user interface 18. Alternatively, it is contemplated that the determination may be made automatically, such as by initializing an optical sensor relative to alignment indicia 72-1, and then controlling a position of the optical sensor using the distance of Y-direction motion of printhead carrier system 40 to determine the Y-offset distance Y1.

At step S204, there is a shifting within portable large format inkjet printer 10 of a start position for printing the selected next output image area portion to compensate for the X-offset distance X1 and the Y-offset distance Y1.

For example, the act of shifting may involve controller 16 executing program instructions to insert null data in the corresponding output image data portion.

Alternatively, for example, the act of shifting may involve controller 16 executing program instructions to change a home position of the plurality of inkjet printheads 42 (e.g., by operating lateral scan mechanism 60 and longitudinal scan mechanism 62) by an amount corresponding to the X-offset distance X1 and the Y-offset distance Y1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a portable large format inkjet printer for printing an image at a media print area of a stationary flat media, comprising:
   determining an output image size of an output image to be printed at the media print area of the stationary flat media;
   selecting a source image to serve as the output image;
   displaying a preview of the output image superposed with an output image grid to represent a division of the output image and corresponding output image data for printing, the output image grid defining a matrix having a plurality of output image area portions;
   selecting a desired grid printing pattern mode from a plurality of selectable grid printing pattern modes, wherein each of the plurality of selectable grid printing pattern modes defines a unique serial order of printing each of the plurality of output image area portions being displayed;
   selecting a next output image area portion of the plurality of output image area portions for printing based on the unique serial order defined by the desired grid printing pattern mode;
   printing the selected next output image area portion at the media print area of the stationary flat media; and
   repeating the acts of selecting the next output image area portion and printing for each of the plurality of output image area portions until an entirety of the output image area has been printed at the media print area of the stationary flat media.

2. The method of claim 1, further comprising dynamically changing one or more visual characteristics of the preview of the output image superposed with the output image grid to distinguish between:
   a subset of the plurality of output image area portions that has been printed;
   a subset of the plurality of output image area portions that is available to be printed; and
   a subset of the plurality of output image area portions that is not currently available for printing.

3. The method of claim 2, wherein the selected next output image area portion is selected from the subset of the plurality of output image area portions that is available to be printed.

4. The method of claim 1, wherein prior to the act of printing, the method further comprising:
   prompting the user to position and align the portable large format inkjet printer at a predetermined location at the media print area of the stationary flat media that corresponds to the selected next output image area portion; and
   performing a fine alignment of the portable large format inkjet printer based on a fine alignment command received by the portable large format inkjet printer.

5. The method of claim 4, wherein the act of performing the fine alignment comprises:
   determining an X-offset distance from an alignment mark at the predetermined location at the media print area of the stationary flat media to an alignment indicia of the portable large format inkjet printer;
   determining a Y-offset distance from the alignment mark at the predetermined location at the media print area of the stationary flat media to the alignment indicia of the portable large format inkjet printer; and
   shifting within the portable large format inkjet printer a start position for printing the selected next output image area portion to compensate for the X-offset distance and the Y-offset distance.

6. The method of claim 5, wherein the act of shifting comprises one of inserting null data in the corresponding output image data portion and shifting a home position of the plurality of inkjet printheads by an amount corresponding to the X-offset distance and the Y-offset distance.

7. A method for printing an image at a media print area of a stationary flat media, comprising:

providing a portable large format inkjet printer having a controller, a user interface, and a printhead carrier system configured to carry a plurality of inkjet printheads;

providing a memory circuit having stored therein image data for at least one image;

operating the user interface to input to the controller an output image size of an output image to be printed at the media print area of a stationary flat media;

operating the user interface to select from the memory circuit a source image to serve as the output image for printing at the media print area of the stationary flat media;

converting source image data representing the source image into output image data representing the output image at the output image size;

dividing an output image area defined by the output image size into an output image grid to form a matrix having a plurality of output image area portions;

displaying at the user interface a preview of the output image superposed with the output image grid to represent a division of the output image and output image data for printing, the output image grid defining a matrix having a plurality of output image area portions;

dividing the output image data into a plurality of output image data portions, wherein each output image data portion corresponds to a respective output image area portion of the plurality of output image area portions;

selecting an output image area portion of the plurality of output image area portions for printing, the selected output image area portion being represented by a corresponding output image data portion; and inputting a print command at the user interface to process the corresponding output image data portion and to initialize printing of the selected output image area portion at the media print area of the stationary flat media.

8. The method of claim 7, comprising repeating the acts of selecting and inputting for each of the plurality of output image area portions until an entirety of the output image area has been printed at the media print area of the stationary flat media.

9. The method of claim 8, further comprising dynamically changing one or more visual characteristics of the preview of the output image superposed with the output image grid to distinguish between:
  a subset of the plurality of output image area portions that has been printed;
  a subset of the plurality of output image area portions that is available to be printed; and
  a subset of the plurality of output image area portions that is not currently available for printing.

10. The method of claim 7, wherein the act of selecting comprises selecting a desired grid printing pattern mode from a plurality of selectable grid printing pattern modes, wherein each of the plurality of selectable grid printing pattern modes defines a unique serial order of printing each of the plurality of output image area portions defined at the user interface.

11. The method of claim 7, wherein prior to the act of inputting the print command, the method comprising:
  positioning the portable large format inkjet printer at the media print area of the stationary flat media; and
  aligning the portable large format inkjet printer with an alignment mark located at the media print area of the stationary flat media.

12. The method of claim 11, wherein the act of aligning comprises:
  inputting a fine alignment command to the user interface of the portable large format inkjet printer;
  determining an X-offset distance from the alignment mark to an alignment indicia of the portable large format inkjet printer;
  determining a Y-offset distance from the alignment mark to the alignment indicia of the portable large format inkjet printer; and
  shifting within the portable large format inkjet printer a start position for printing the selected output image area to compensate for the X-offset distance and the Y-offset distance.

13. The method of claim 12, wherein the act of shifting comprises one of inserting null data in the corresponding output image data portion and shifting a home position of the plurality of inkjet printheads by an amount corresponding to the X-offset distance and the Y-offset distance.

14. The method of claim 7, wherein prior to the act of inputting the print command, the method comprising:
  determining an X-offset distance from an alignment mark located at the media print area of the stationary flat media to an alignment indicia of the portable large format inkjet printer;
  determining a Y-offset distance from the alignment mark located at the media print area of the stationary flat media to the alignment indicia of the portable large format inkjet printer; and
  shifting within the portable large format inkjet printer a start position for printing the selected output image area to compensate for the X-offset distance and the Y-offset distance.

15. The method of claim 14, wherein the act of shifting comprises inserting null data in the corresponding output image data portion.

16. The method of claim 14, wherein the act of shifting comprises shifting a home position of the plurality of inkjet printheads by an amount corresponding to the X-offset distance and the Y-offset distance.

* * * * *